United States Patent
Risher

(10) Patent No.: US 12,286,837 B2
(45) Date of Patent: Apr. 29, 2025

(54) MODULAR CLUTCH ASSEMBLY FOR A WINDOW COVERING

(71) Applicant: Draper, Inc., Spiceland, IN (US)

(72) Inventor: Kenneth M. Risher, Indianapolis, IN (US)

(73) Assignee: Draper, Inc., Spiceland, IN (US)

( * ) Notice: Subject to any disclaimer, the term of this patent is extended or adjusted under 35 U.S.C. 154(b) by 19 days.

(21) Appl. No.: 16/269,310

(22) Filed: Feb. 6, 2019

(65) Prior Publication Data

US 2020/0248504 A1 Aug. 6, 2020

(51) Int. Cl.
| | |
|---|---|
| *E06B 9/42* | (2006.01) |
| *E06B 9/56* | (2006.01) |
| *F16D 41/20* | (2006.01) |
| *E06B 9/58* | (2006.01) |
| *E06B 9/80* | (2006.01) |
| *E06B 9/90* | (2006.01) |

(52) U.S. Cl.
CPC .................. *E06B 9/42* (2013.01); *E06B 9/56* (2013.01); *F16D 41/206* (2013.01); *E06B 2009/587* (2013.01); *E06B 2009/801* (2013.01); *E06B 2009/905* (2013.01)

(58) Field of Classification Search
CPC ..... E06B 9/42; E06B 9/50; E06B 9/56; E06B 9/40; E06B 9/174; A47H 1/142; A47H 1/14; A47H 1/12; A47H 1/10; A47H 1/102; A47H 1/122; A47H 1/144; E03B 9/323
See application file for complete search history.

(56) References Cited

U.S. PATENT DOCUMENTS

| | | | |
|---|---|---|---|
| 1,476,160 | A | 12/1923 | Kirsch |
| 2,013,500 | A | 9/1935 | O'Connor |
| 2,486,996 | A | 11/1949 | Stuber et al. |
| 2,524,711 | A | 10/1950 | Nelson |
| 2,974,918 | A | 3/1961 | Voigtlander |
| 3,005,615 | A | 10/1961 | McKay |
| 3,102,584 | A | 9/1963 | Znamirowski |
| 4,179,091 | A | 12/1979 | Bidney |
| 4,223,714 | A | 9/1980 | Weinreich et al. |

(Continued)

FOREIGN PATENT DOCUMENTS

| | | |
|---|---|---|
| CA | 2613690 A1 | 6/2008 |
| CA | 2902473 A1 | 2/2017 |

OTHER PUBLICATIONS

Apex Fasteners, Removable Rivets, available Dec. 2, 2015 from https://web.archive.org/web/20151203145425/https://apexfasteners.com/fasteners/plastic-molded-products/plastic-panel-fasteners/removable-rivets. accessed Mar. 13, 2023 (Year: 2015).*

(Continued)

*Primary Examiner* — Johnnie A. Shablack
*Assistant Examiner* — Jeremy C Ramsey
(74) *Attorney, Agent, or Firm* — Faegre Drinker Biddle & Reath LLP

(57) ABSTRACT

Systems for supporting a roller clutch assembly for a fabric covering may include a housing assembly. The housing assembly may include a first side, a second side, a third side, and a fourth side. At least one of the first, second, third, and fourth sides may define a mounting interface of the housing assembly within a depth of the housing assembly. The systems may also include a bracket received within the depth of the housing assembly and which is removably coupled to the mounting interface.

25 Claims, 26 Drawing Sheets

(56) References Cited

U.S. PATENT DOCUMENTS

| | | |
|---|---|---|
| 4,224,974 A | 9/1980 | Anderson et al. |
| 4,270,720 A | 6/1981 | Fukuchi |
| 4,399,855 A | 8/1983 | Volfson |
| 4,453,688 A | 6/1984 | Nakajima et al. |
| 4,538,785 A | 9/1985 | Damsgaard |
| 4,572,467 A | 2/1986 | Farrell |
| 4,711,437 A | 12/1987 | Longenecker et al. |
| 4,738,420 A | 4/1988 | Angle et al. |
| 4,884,618 A | 12/1989 | Steeves |
| 5,195,570 A | 3/1993 | Marocco |
| 5,609,196 A | 3/1997 | Kraler |
| 6,196,508 B1 | 3/2001 | Nijs |
| 6,643,945 B1 | 11/2003 | Starks |
| 6,782,938 B2 | 8/2004 | Colson et al. |
| 6,935,401 B2 | 8/2005 | Fraczek et al. |
| 7,854,419 B2 | 12/2010 | Ng et al. |
| 7,891,399 B2 | 2/2011 | Rasmussen |
| 8,122,932 B2 | 2/2012 | Cannaverde |
| 8,151,859 B2 | 4/2012 | Koop et al. |
| 8,201,789 B1 | 6/2012 | Chou |
| 8,382,050 B2 | 2/2013 | Koop |
| 8,403,289 B1 | 3/2013 | Rinderer |
| 8,608,126 B2 | 12/2013 | Ng et al. |
| 8,672,115 B1 | 3/2014 | Jennings et al. |
| 8,967,227 B2 | 3/2015 | Chou |
| 9,138,093 B1 | 9/2015 | Chou |
| 9,303,707 B2 | 4/2016 | Fraczek |
| D758,985 S | 6/2016 | Jennings et al. |
| 10,221,621 B2 | 3/2019 | Marcinik et al. |
| 10,323,793 B2 * | 6/2019 | Daniels ............... F16M 13/027 |
| 2006/0272782 A1 | 12/2006 | Nichols et al. |
| 2008/0121353 A1 | 5/2008 | Detmer et al. |
| 2009/0308543 A1 | 12/2009 | Kates |
| 2010/0200179 A1 | 8/2010 | DiStefano |
| 2010/0288451 A1 | 11/2010 | Bohlen |
| 2011/0006176 A1 | 1/2011 | Krantz-Lilienthal |
| 2011/0139381 A1 | 6/2011 | Daniels |
| 2011/0139382 A1 | 6/2011 | Daniels |
| 2012/0090795 A1 | 4/2012 | Kirby |
| 2012/0160975 A1 * | 6/2012 | Cannaverde ............ E06B 9/174 |
| | | 248/208 |
| 2013/0105649 A1 | 5/2013 | Wills et al. |
| 2013/0284383 A1 | 10/2013 | Feldstein et al. |
| 2013/0312920 A1 | 11/2013 | Mullet et al. |
| 2014/0166218 A1 | 6/2014 | Ng |
| 2014/0174678 A1 * | 6/2014 | Chou ....................... A47H 1/14 |
| | | 160/368.1 |
| 2014/0262067 A1 | 9/2014 | Higgins et al. |
| 2014/0299729 A1 | 10/2014 | Wills |
| 2015/0027059 A1 | 1/2015 | Lu et al. |
| 2015/0337595 A1 | 11/2015 | Seib |

OTHER PUBLICATIONS

MechoSystems—Manual Shades, Mecho®/5 DoubleShades®, MechoShade Systems, Inc., http://www.mechoshade.com/manualshades/doubleshades.php, retrieved Jun. 6, 2018, 15 pages.

* cited by examiner

MODULAR CLUTCH ASSEMBLY FOR A WINDOW COVERING

FIELD OF THE DISCLOSURE

The present disclosure relates to a window covering and, more particularly, to mounting a roller clutch assembly of the window covering to a wall, window casing, or other similar structure.

BACKGROUND

Window coverings are typically provided to block ambient light from entering a room. Some window coverings have rollers about which the fabric cover is wound and which allow for the fabric cover to be positioned at any level with respect to the window. The roller may have a clutch assembly supported on the wall or window casing that allows for movement of the fabric cover.

The configuration of a window, wall, or other similar structure may make it difficult to mount the roller clutch assembly of the window covering. As such, there is a need for a system and method of mounting a roller clutch assembly which can accommodate various wall and window orientations and configurations.

SUMMARY

According to an embodiment of the present disclosure, a system for supporting a roller clutch assembly for a fabric covering and which is configured to rotate about an axis is disclosed. The system comprises a housing assembly having a first side, a second side, a third side, and a fourth side, and at least one of the first, second, third, and fourth sides defines a mounting interface of the housing assembly within a depth of the housing assembly. The system further comprises a bracket received within the depth of the housing assembly and removably coupled to the mounting interface.

In another embodiment of the present disclosure, a system for supporting a fabric covering comprises a first housing assembly configured to support a first roller clutch assembly. The system also comprises a bracket configured to be removably coupled within a first portion of the first housing assembly and configured to support the first housing assembly on an external structure. Additionally, the system comprises a joining member configured to be removably coupled within a second portion of the first housing assembly.

In a further embodiment of the present disclosure, a method of mounting a roller clutch assembly to an external structure comprises providing a first housing assembly, supporting the roller clutch assembly on the first housing assembly, coupling a first portion of a bracket within a portion of the first housing assembly, coupling a second portion of the bracket to the external structure, and coupling the housing assembly to the external structure.

Additional features and advantages will become apparent to those skilled in the art upon consideration of the following detailed description.

BRIEF DESCRIPTION OF THE DRAWINGS

Advantages and features of the embodiments of this disclosure will become more apparent from the following detailed description of exemplary embodiments when viewed in conjunction with the accompanying drawings, wherein.

Figure 1:
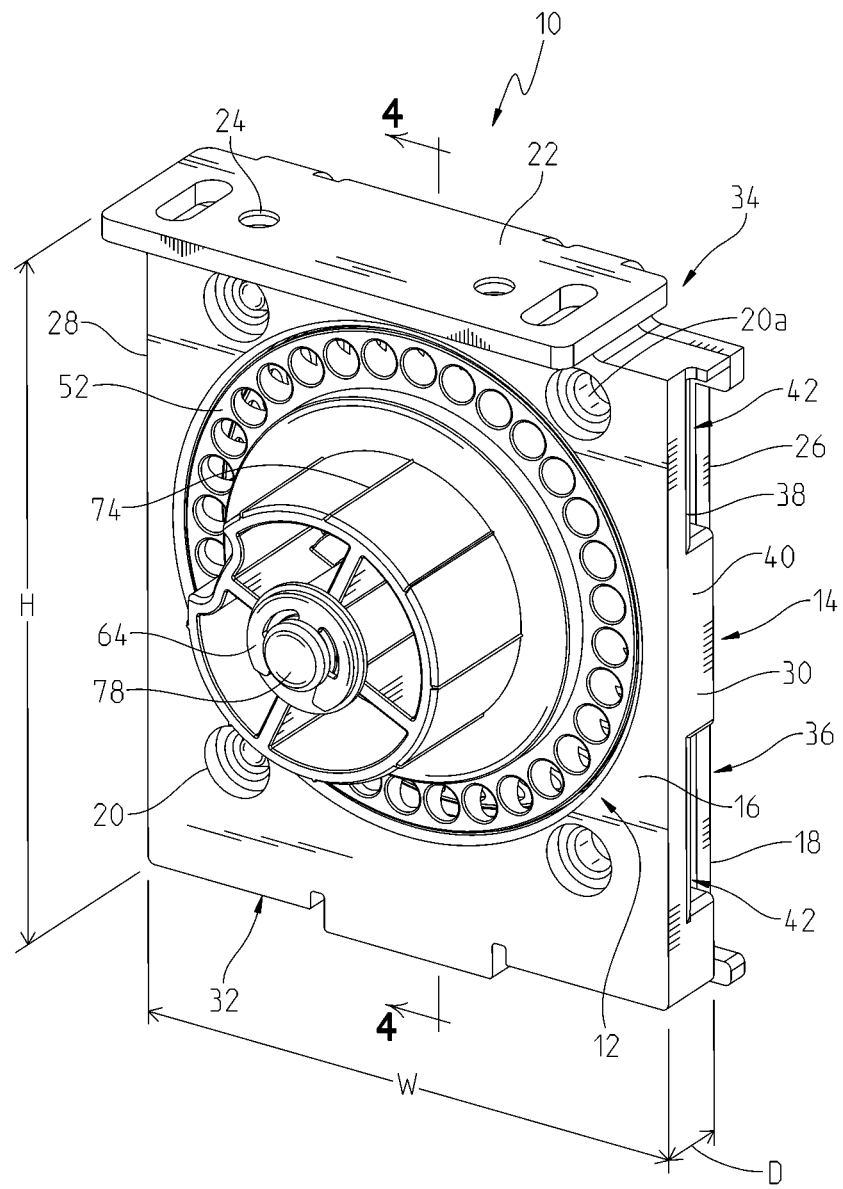
FIG. 1 is a front perspective view of a housing assembly and a roller clutch assembly of the present disclosure.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplifications set out herein illustrate embodiments of the disclosure, in one form, and such exemplifications are not to be construed as limiting the scope of the disclosure in any manner.

DETAILED DESCRIPTION OF THE DRAWINGS

Referring to FIGS. 1-4, a roller clutch and housing assembly 10 for a fabric covering includes a roller clutch assembly 12 and a housing assembly 14. Housing assembly 14 includes an outer cover 16 and an inner cover 18 removably coupled together. Housing assembly 14 is configured to be coupled to a wall, window casing, or other similar structure (not shown) by receiving removable fasteners (e.g., screws) through apertures 20 which extend through outer and inner covers 16, 18. Additionally, inner cover 18 includes a fixed bracket portion 22 configured to be removably coupled to a second portion of the wall or window casing. For example, outer and inner covers 16, 18 may receive fasteners through respective apertures 20a, 20b to couple housing assembly 14 to a vertical portion of a window casing while fixed bracket portion 22 may receive fasteners through apertures 24 to couple housing assembly 14 to a horizontal portion of the window casing. Fixed bracket portion 22 may be integrally formed with a main portion 26 of inner cover 18 or may be separate therefrom but fixedly coupled thereto such that fixed bracket portion 22 has a fixed position relative to main portion 26. Housing assembly 14 may be comprised of a rigid material, such as a rigid polymeric and/or metallic material.

As shown in FIGS. 1-4, housing assembly 14 extends laterally between a first side 28 and a second side 30 and vertically between a third side 32 and a fourth side 34 such that housing assembly 14 generally defines a rectangular shape. Any of sides 28, 30, 32, 34 may include one or more fixed bracket portions 22 and, illustratively, fourth side 34 is integrally formed with fixed bracket portion 22. The distance between first and second sides 28, 30 defines a width W of housing assembly 14, the distance between third and fourth sides 32, 34 defines a height H of housing assembly 14, and a distance between the exterior faces of outer and inner covers 16, 18 defines a depth D of housing assembly 14.

Figure 2:
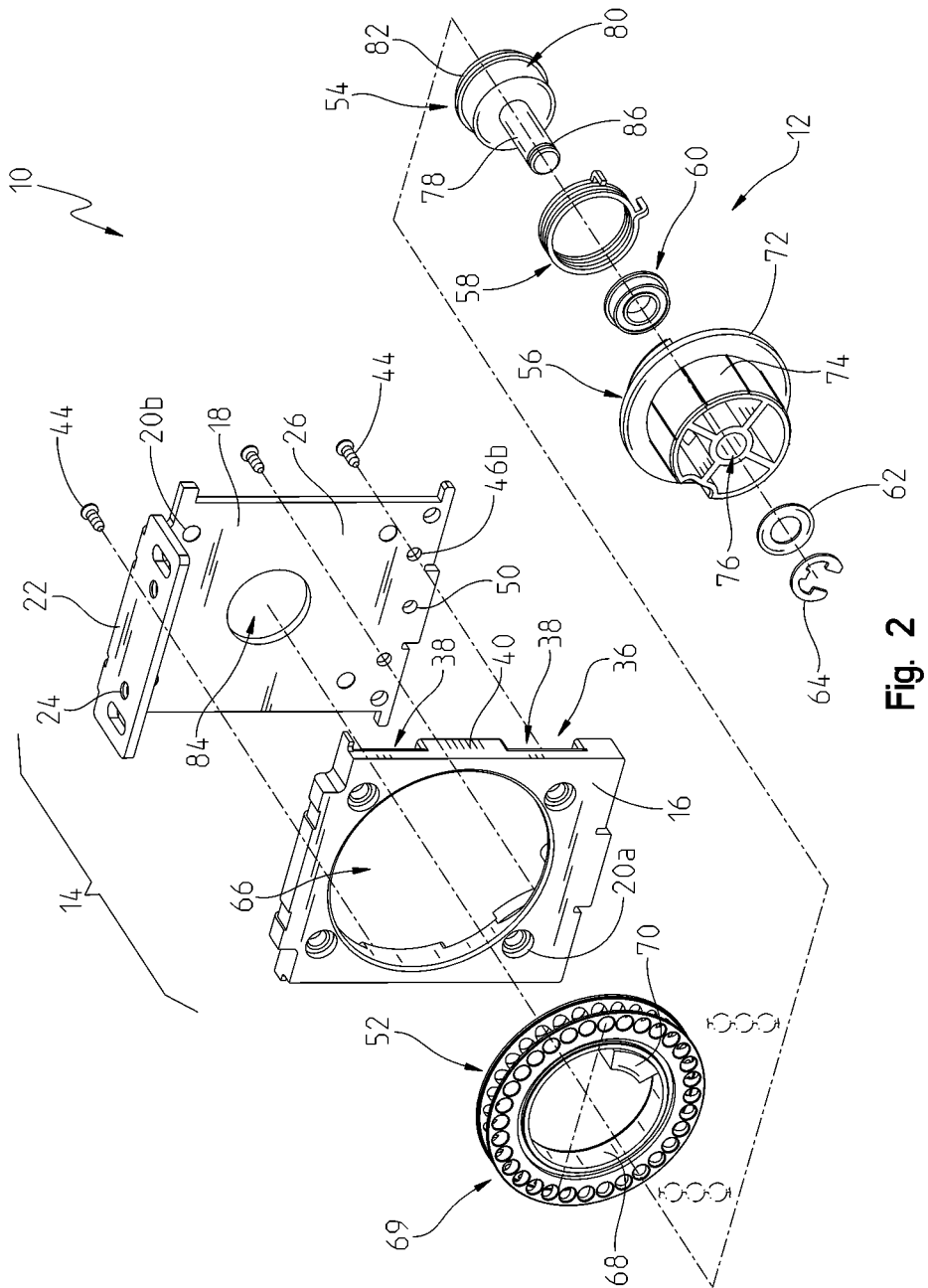
FIG. 2 is a front exploded view of the housing assembly and the roller clutch assembly of FIG. 1.

Additionally, any of sides 28, 30, 32, 34 may be configured to couple with a removable bracket, as disclosed further herein. More particularly, outer and inner covers 16, 18 cooperate with each other when coupled together to form a receiving portion 36 for joining with the removable bracket. Illustratively, as shown in FIGS. 1 and 2, receiving portion 36 is defined by recesses 38 on outer cover 16 which, when outer cover 16 is coupled with inner cover 18, define slots 42. In one embodiment, housing assembly 14 includes two slots 42 along any of sides 28, 30, 32, 34 and slots 42 are spaced apart by a protrusion 40 on outer cover 16 which extends towards inner cover 18. In this way, when outer cover 16 is coupled to inner cover 18, protrusion 40 may contact inner cover 18 while recesses 38 of outer cover 16 are spaced apart therefrom to define slots 42. Slots 42 are configured to receive at least a portion of a removable bracket, as disclosed further hereinafter. In one embodiment, one or more of sides 28, 30, 32, 34 includes a single slot 42.

Figure 3:
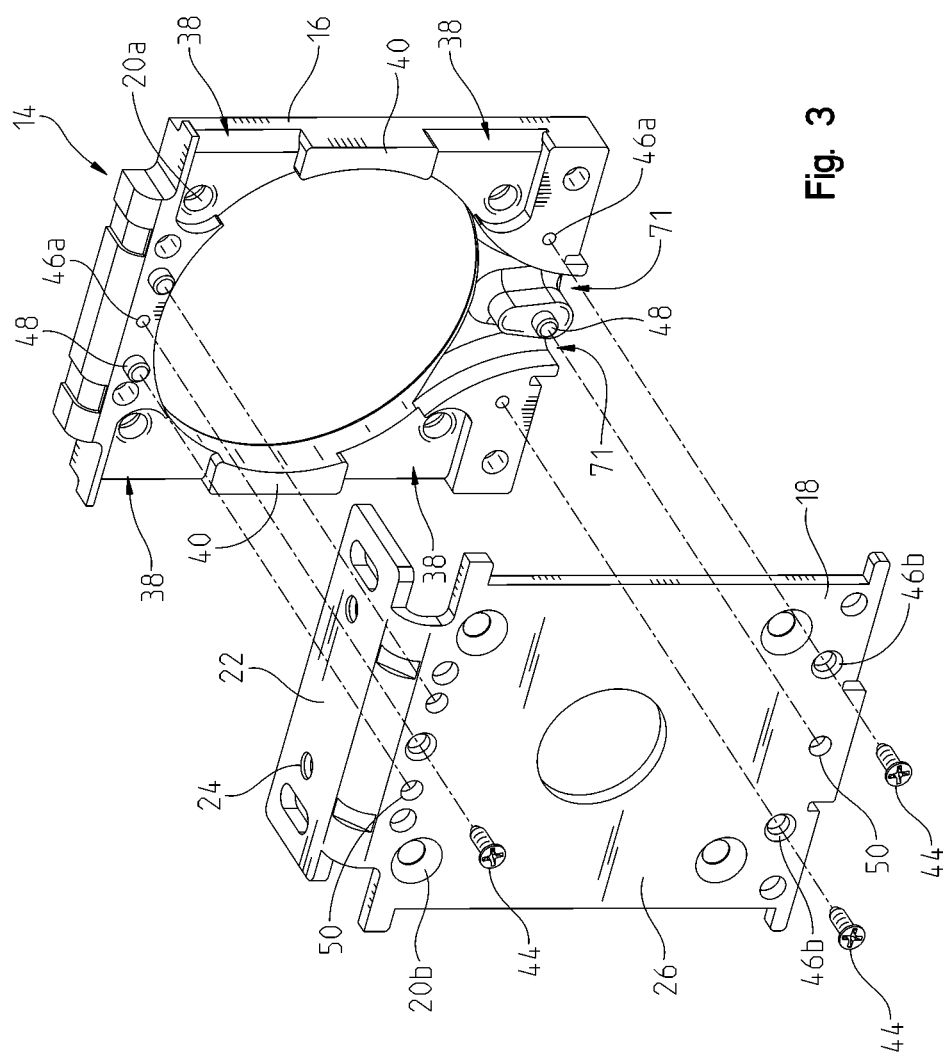
FIG. 3 is a rear exploded view of the housing assembly of FIG. 1.

As shown in FIG. 3, outer and inner covers 16, 18 are coupled together with removable fasteners 44 (e.g., screws) which are received through openings 46b of inner cover 18 and into openings 46a of outer cover 16. In this way, the head of fasteners 44 is positioned along the innermost surface of inner cover 18 such that they are not visible when housing assembly 14 is mounted to a wall, window casing, or other similar surface. Outer cover 16 also is retained on inner cover 18 using pins 48 projecting from outer cover 16 towards inner cover 18. More particularly, pins 48 are received within openings 50 on inner cover 18. As such, outer and inner covers 16, 18 are coupled together through fasteners 44 and pins 48.

Referring still to FIGS. 1-4, housing assembly 14 supports clutch assembly 12 thereon, which allows a beaded chain or other similar member to raise and lower a fabric covering 90 (FIG. 4) between a raised position and a lowered position. Fabric covering 90 is wound about a roller tube 91. Clutch assembly 12 also may be configured to maintain the position of fabric covering 90 at a position set by the user. Clutch assembly 12 is configured to rotate about an axis A.

Referring to FIG. 2, clutch assembly 12 includes a beaded chain wheel 52, a clutch spring driver 54, a drive adapter 56, a spring 58, a guide member 60, a washer 62, and a retention member 64. Beaded chain wheel 52 is supported within an opening 66 of outer cover 16 and is configured to receive at least a portion of drive adapter 56 along an inner radial surface 68. Inner radial surface 68 of beaded chain wheel 52 includes a protrusion 70 extending radially inward therefrom and is configured to engage drive adapter 56 during operation of clutch assembly 12. Further, as known in the art, beaded chain wheel 52 includes a circumferential portion 69 (see FIG. 2) which receives a bead chain 53 (representative portions shown in FIG. 2). Bead chain 53 is guided through channels 71 (see FIG. 3) when clutch assembly 12 is assembled to housing assembly 14.

Drive adapter 56 includes a support surface 72 which retains drive adapter 56 along inner radial surface 68 of beaded chain wheel 52. Drive adapter 56 also includes a nose 74 which extends outward from support surface 72. Nose 74 includes an internal channel 76 configured to receive a portion of clutch spring driver 54. More particularly, a shaft 78 of clutch spring driver 54 is received through channel 76 when drive adapter 56 and clutch spring driver 54 are coupled together. Clutch spring driver 54 also includes a recessed portion 80 configured to receive spring 58 and a retention portion 82 configured to cooperate with an opening 84 of inner cover 18 for supporting clutch spring driver 54 on inner cover 18. Guide member 60 also is received on shaft 78 of clutch spring driver 54 for aligning and coupling clutch spring driver 54 with drive adapter 56. Shaft 78 extends through nose 74 and clutch spring driver 54 and drive adapter 56 are further coupled together with washer 62 and retention member 64. In one embodiment, retention member 64 is a C-clip frictionally retained within a groove 86 on shaft 78 to prevent axial movement of clutch spring driver 54 relative to drive adapter 56.

In operation, when a roller 91 (see FIG. 4), which supports fabric covering 90, is coupled to roller clutch and housing assembly 10, one end (e.g., a first or proximal end) of roller 91 receives at least nose 74 of drive adapter 56 of clutch assembly 12 to allow fabric covering 90 to move between the raised and lowered positions and also allow fabric covering 90 to be maintained at a position desired by the user. It may be appreciated that the proximal end of the roller may receive the entirety of nose 74 such that the roller and fabric covering 90 are positioned close to housing assembly 14. In this way, any light gap 92, defined as the distance between fabric covering 90 and housing assembly 14, is minimized, as shown best in FIG. 4.

To further support the roller and fabric covering 90, a second or idler housing assembly 100 is configured to receive the second or distal end of roller 91. For example, second housing assembly 100 is positioned at an opposing end of a window casing, wall, or similar structure at a distance from housing assembly 14 that allows the roller to be supported on both housings 14, 100. Referring now to FIGS. 5-8, second housing assembly 100 includes an outer cover 102 and an inner cover 104 removably coupled together. Second housing assembly 100 is configured to be coupled to the wall, window casing, or other similar structure (not shown) by receiving removable fasteners (e.g., screws) through apertures 106 which extend through outer and inner covers 102, 104. Additionally, inner cover 104 includes a fixed bracket portion 108 configured to be removably coupled to a second portion of the wall or window casing. For example, outer and inner covers 102, 104 may receive fasteners through respective apertures 106a, 106b to couple second housing assembly 100 to a vertical portion of a window casing while fixed bracket portion 108 may receive fasteners through apertures 110 to couple inner cover 104 to a horizontal portion of the window casing. Fixed bracket portion 108 may be integrally formed with a main portion 112 of inner cover 104 or may be separate therefrom but fixedly coupled thereto. It may be appreciated that fixed bracket portion 108 has a fixed position relative to main portion 112. Second housing assembly 100 may be comprised of a rigid material, such as a rigid polymeric and/or metallic material.

As shown in FIGS. 5-8, second housing assembly 100 extends laterally between a first side 114 and a second side 116 and vertically between a third side 118 and a fourth side 120 such that second housing assembly 100 generally defines a rectangular shape. Any of sides 114, 116, 118, 120 may include one or more fixed bracket portions 108 and, illustratively, fourth side 120 is integrally formed with fixed bracket portion 108.

Figure 5:
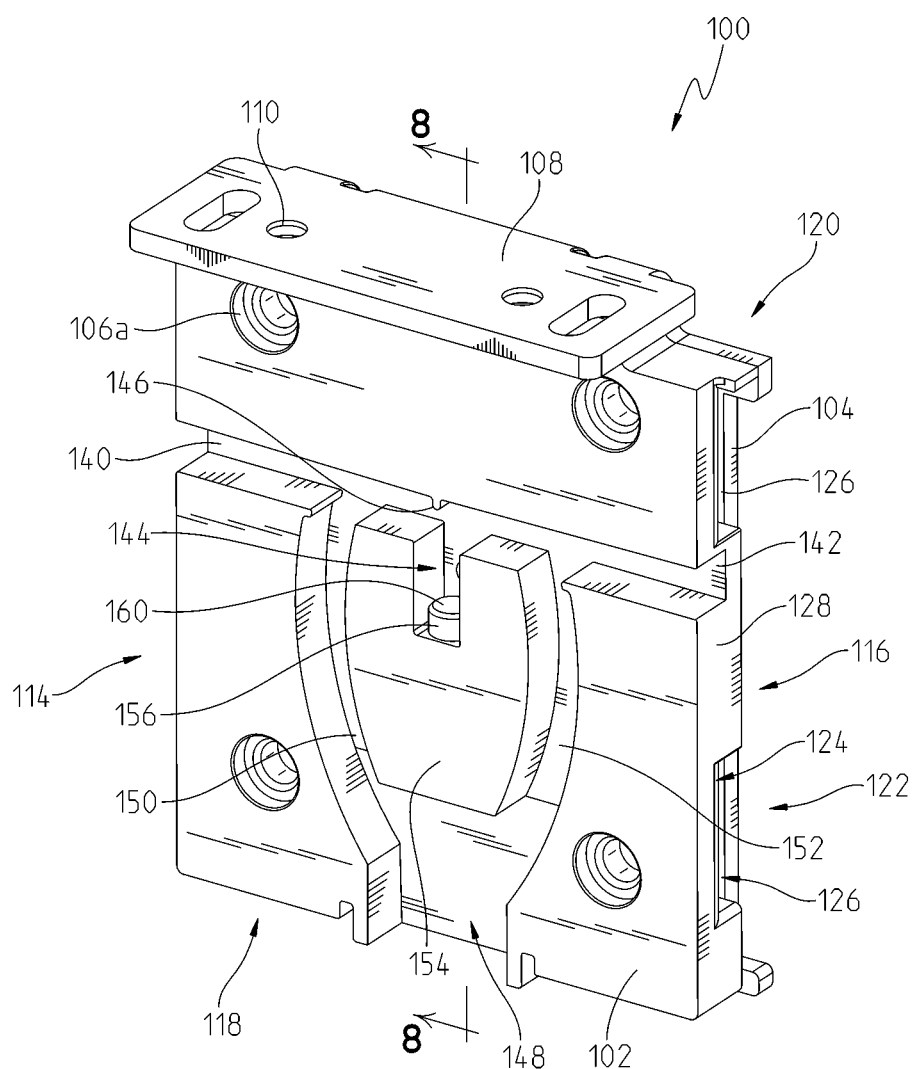
FIG. 5 is a front perspective view of a second housing assembly configured to receive a portion of a roller tube supported by the roller clutch assembly of FIG. 1.
Figure 6:
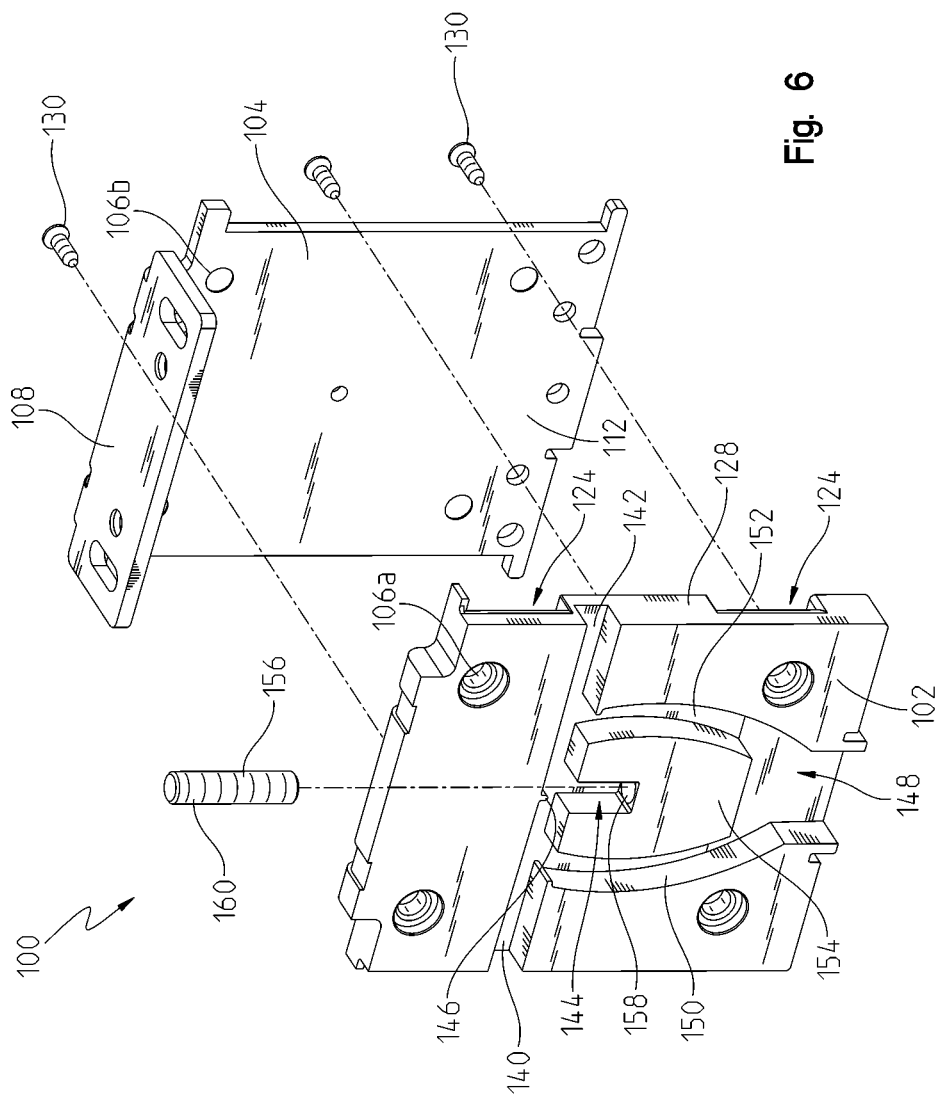
FIG. 6 is a front exploded view of the second housing assembly of FIG. 5.
Figure 7:
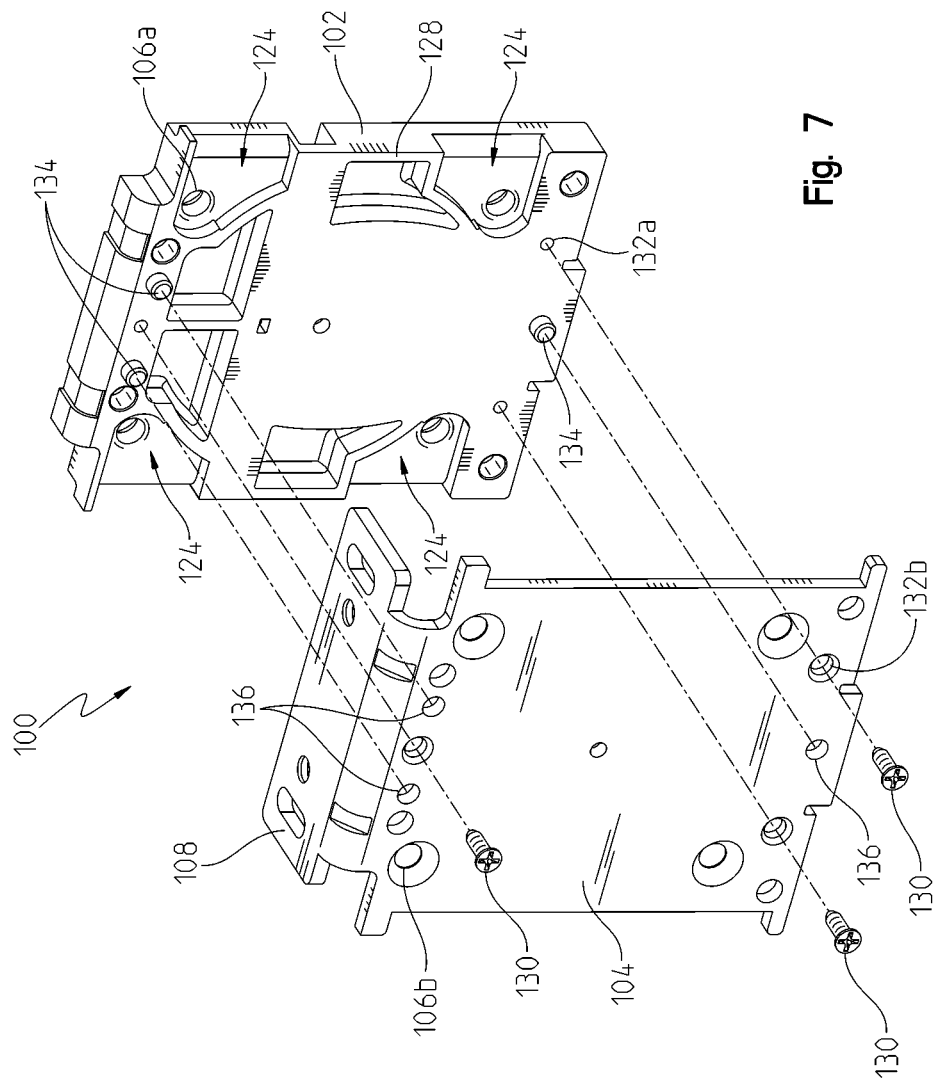
FIG. 7 is a rear exploded view of the second housing assembly of FIG. 5.

Additionally, any of sides 114, 116, 118, 120 may be configured to couple with a removable bracket, as disclosed further herein. More particularly, outer and inner covers 102, 104 cooperate with each other when coupled together to form a receiving portion 122 for joining with the removable bracket. Illustratively, as shown in FIGS. 5-7, receiving portion 122 is defined by recesses 124 on outer cover 102 which, when outer cover 102 is coupled with inner cover 104, define slots 126. In one embodiment, second housing assembly 100 includes two slots 126 along any of sides 114, 116, 118, 120 and slots 126 are spaced apart by a protrusion 128 on outer cover 102 which extends towards inner cover 104. In this way, when outer cover 102 is coupled to inner cover 104, protrusion 128 may contact inner cover 104 while recesses 124 of outer cover 102 are spaced apart therefrom to define slots 126. Slots 126 are configured to receive at least a portion of a removable bracket, as disclosed further hereinafter. In one embodiment, one or more of sides 114, 116, 118, 120 includes a single slot 126.

Figure 8:
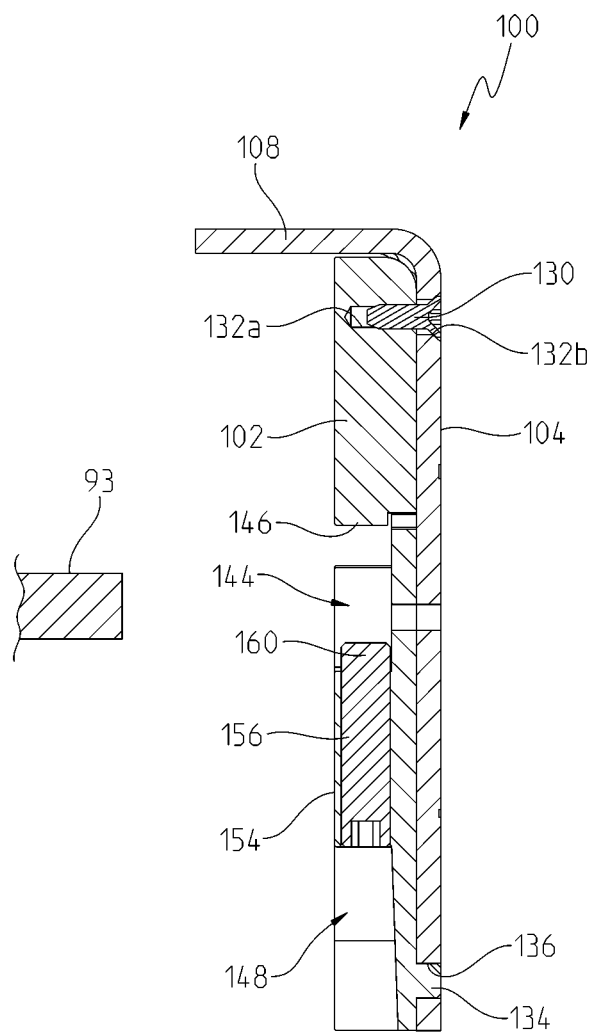
FIG. 8 is a cross-sectional view of the second housing assembly of FIG. 5, taken along line 8-8 of FIG. 5.

As shown in FIGS. 7 and 8, outer and inner covers 102, 104 are coupled together with removable fasteners 130 (e.g., screws) which are received through openings 132b of inner cover 104 and into openings 132a of outer cover 102. In this way, the head of fasteners 130 is positioned along the innermost surface of inner cover 104 such that they are not visible when second housing assembly 100 is mounted to a wall, window casing, or other similar surface. Outer cover 102 also is retained on inner cover 104 using locators, illustratively pins 134, projecting from outer cover 102 towards inner cover 104. More particularly, pins 134 are received within openings 136 on inner cover 104. As such, outer and inner covers 102, 104 are coupled together through fasteners 130 and pins 134.

Referring still to FIGS. 5 and 6, outer cover 102 includes a plurality of channels configured to receive the distal end 93 (see FIG. 8, illustratively the distal end is a round pin) of roller 91. Illustratively, outer cover 102 includes a first channel 140 extending inwardly from first side 114 of second housing assembly 100 and a second channel 142 extending inwardly from second side 116 of second housing assembly 100. In this way, the distal end of the roller may be positioned in either of first or second channels 140, 142, depending on the position of second housing 100 relative to the window casing, wall, etc. The distal end of the roller can be positioned at the laterally outer opening of either of channels 140, 142 to move or slide inwardly towards a retention channel 144 configured to maintain the position of the roller thereon. In one embodiment, retention channel 144 extends vertically and generally perpendicularly to first and second channels 140, 142, however, in other embodiments, retention channel 144 may have a different orientation or configuration. Once the distal end of the roller slides inwardly towards retention channel 144, the distal end of the roller is positioned over retention channel 144 when the distal end contacts detent 146 (see FIG. 8), which is generally vertically aligned with retention channel 144. Detent 146 allows the user or installer to guide the distal end of the roller towards retention channel 144 even if retention channel 144 is not visible to the user or installer.

Additionally, and still referring to FIGS. 5 and 6, depending on the position of second housing assembly 100 relative to the window casing, wall, or other structure, it may be necessary to join the distal end of the roller with second housing assembly 100 from third end 118. More particularly, third end 118 may include an opening 148 which feeds into a third channel 150 and a fourth channel 152. In one embodiment, third and fourth channels 150, 152 extend in a generally vertical direction and open into first and second channels 140, 142, respectively. Third and fourth channels 150, 152 are defined by a protrusion or guide member 154, which also defines retention channel 144. Illustratively, guide member 154 is positioned laterally intermediate third and fourth channels 150, 152 and vertically intermediate opening 148 and first and second channels 140, 142.

If the user or installer chooses to assemble the roller with second housing assembly 100 using opening 148, the distal end of the roller may move through opening 148 and into either third or fourth channel 150, 152 before being received within respective first or second channel 140, 142. Again, once the distal end of the roller moves within first or second channel 140, 142 and contacts detent 146, the distal end can be moved downwardly into retention channel 144 to secure the distal end to second housing assembly 100.

Once the distal end of the roller is received within retention channel 144, the distal end is supported by a pin 156 positioned within retention channel 144. As shown best in FIG. 6, pin 156 is received within an aperture 158 of guide member 154 and an upper extent 160 of pin 156 is exposed within retention channel 144 while the remainder of pin 156 is concealed by guide member 154. Pin 156 may be removably coupled to, or otherwise support, the distal end of the roller for coupling the roller to second housing assembly 100. In embodiments, pin 156 includes a threaded exterior 155 which is threaded into an aperture 157 of guide member 154 such that a top surface 159 of pin 156 may be raised or lowered relative to guide member 154. An advantage, among others, of this adjustability is to assist in raising or lowering one end of roller 91 to level roller 91 relative to the environment. In other embodiments, pin 156 is not threaded, but is one of a plurality of pins 156 that may be selected for insertion into aperture 157, each of the plurality of pins 156 having a different height.

Figure 9:
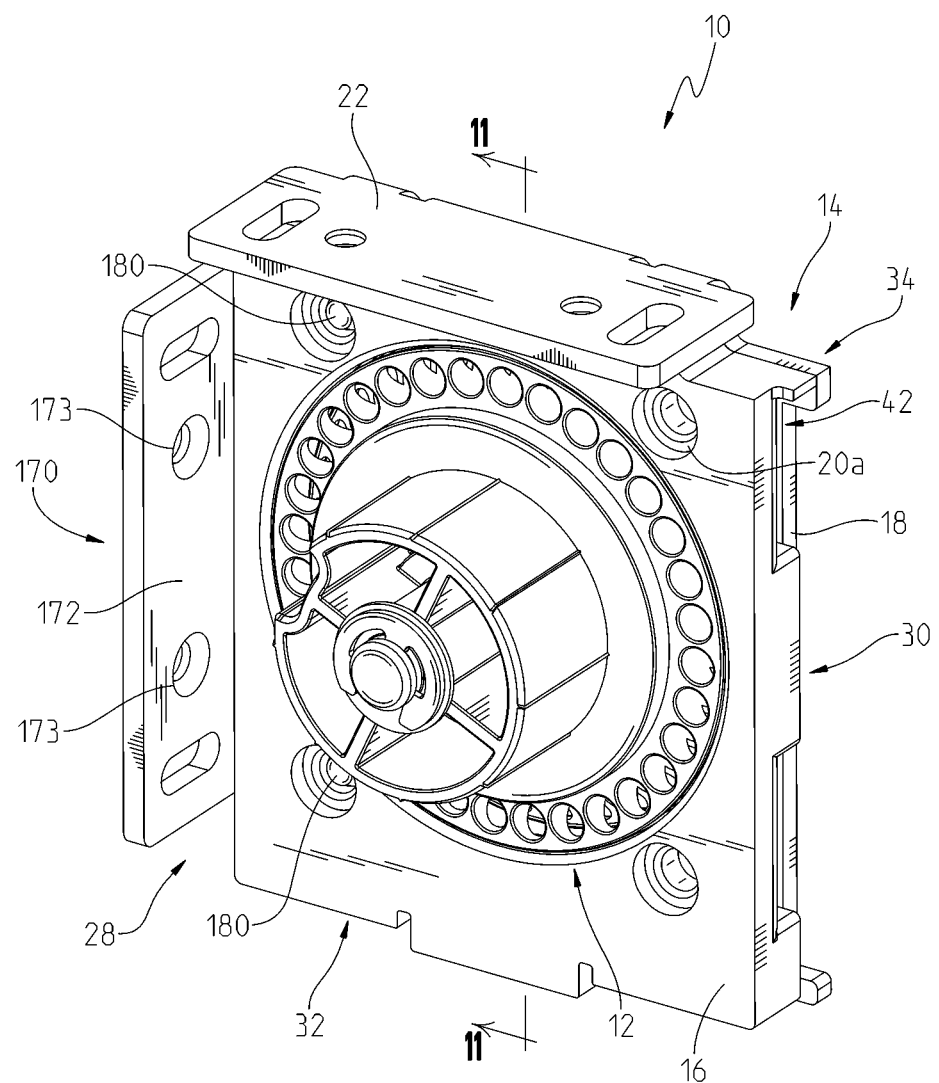
FIG. 9 is a front perspective view of the housing and roller clutch assemblies of FIG. 1, where the housing assembly is coupled with a removable bracket on a first lateral side.
Figure 10:
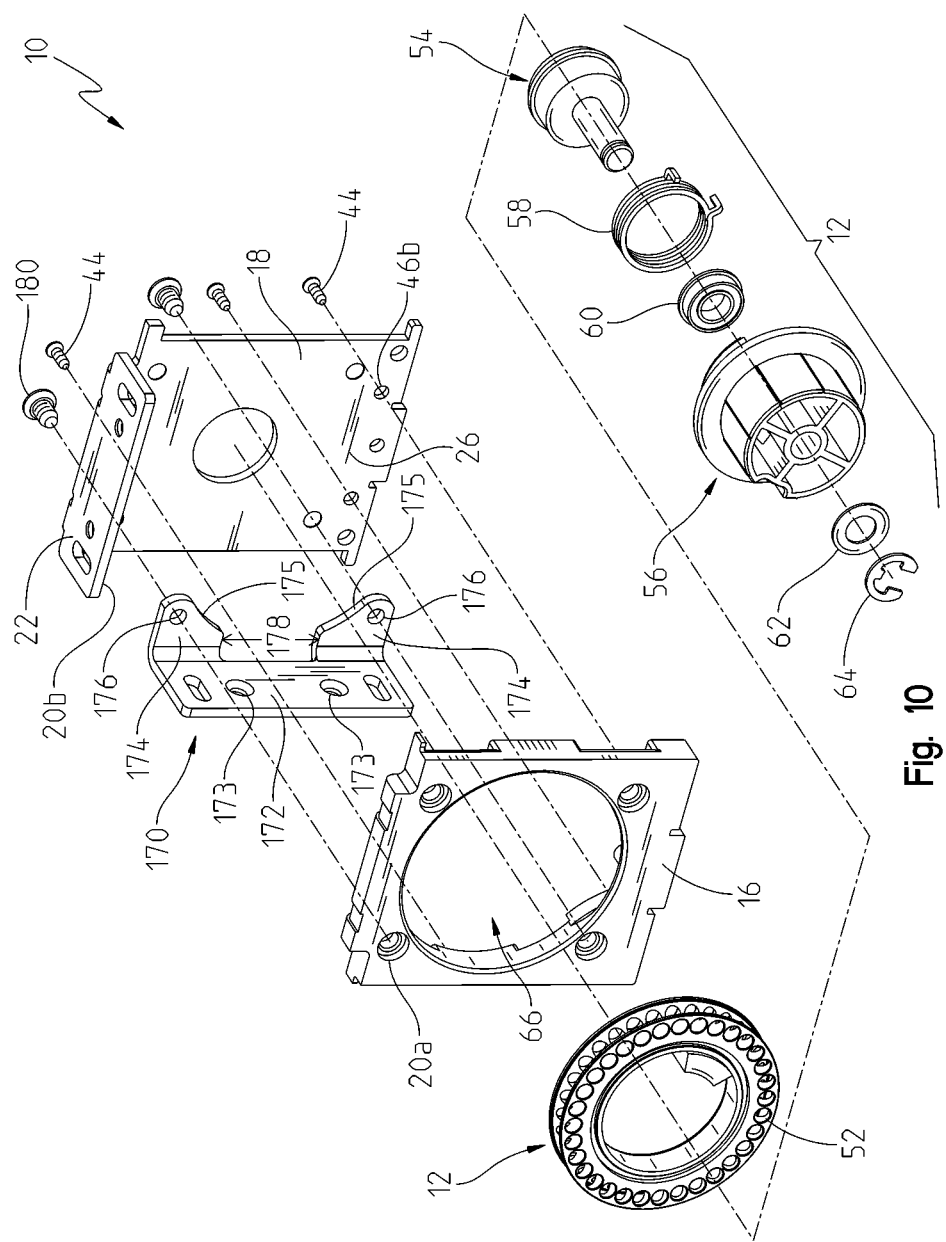
FIG. 10 is a front exploded view of the housing and roller clutch assemblies of FIG. 9.
Figure 11:
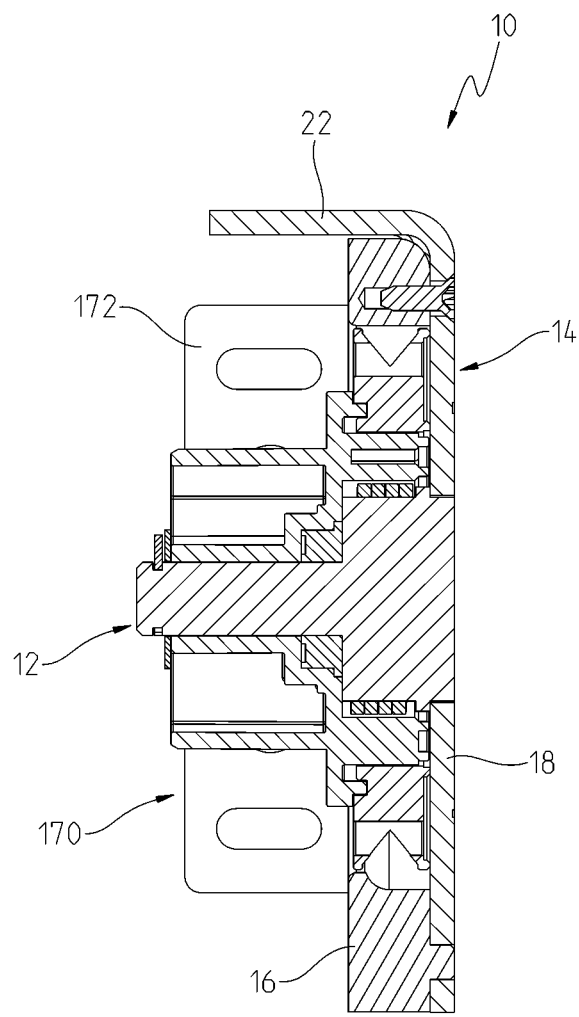
FIG. 11 is a cross-sectional view of the housing and roller clutch assemblies of FIG. 9, taken along line 11-11 of FIG. 9.
Figure 12:
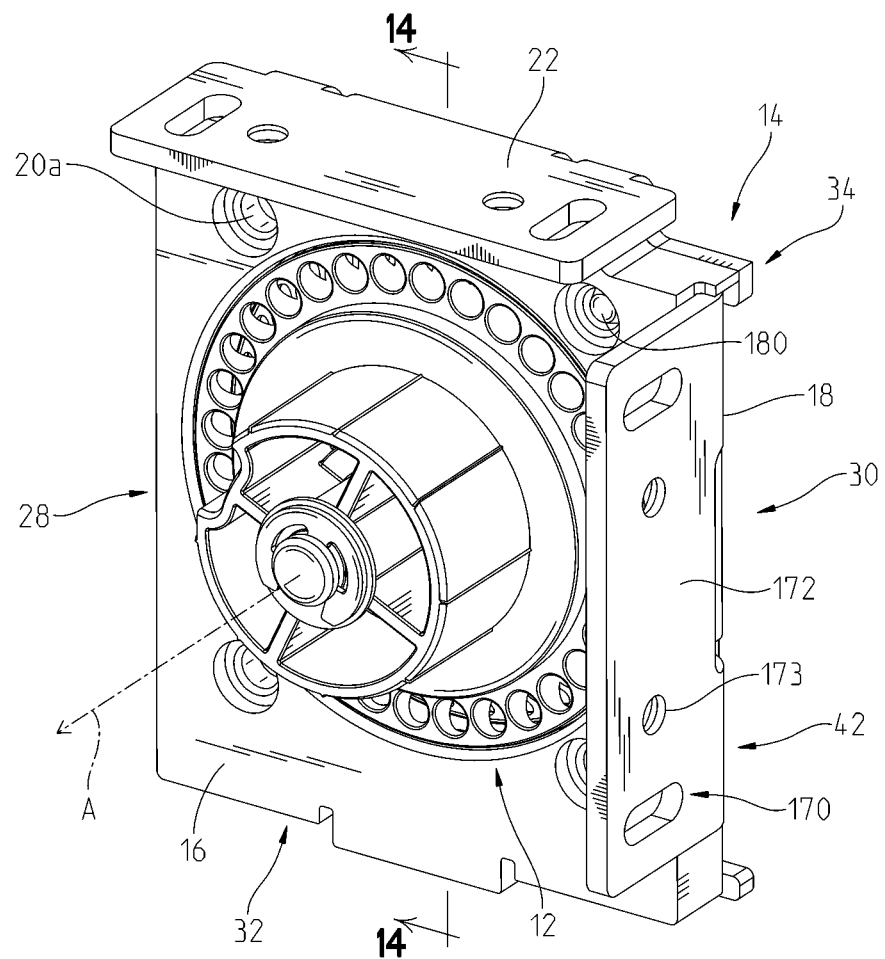
FIG. 12 is a front perspective view of the housing and roller clutch assemblies of FIG. 9, which is coupled to the removable bracket on the opposing lateral side thereof.
Figure 13:
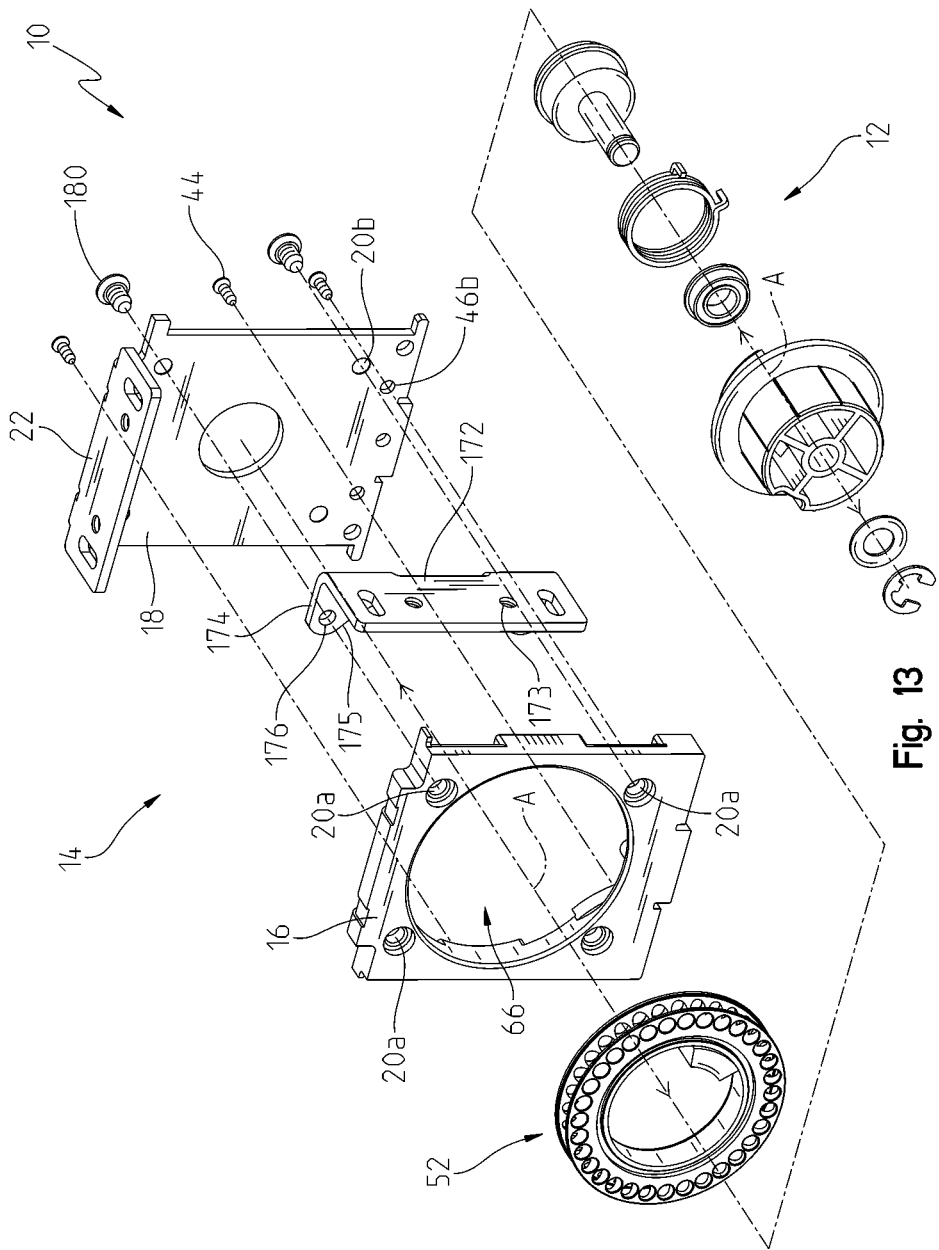
FIG. 13 is a front exploded view of the housing and roller clutch assemblies of FIG. 12.
Figure 14:
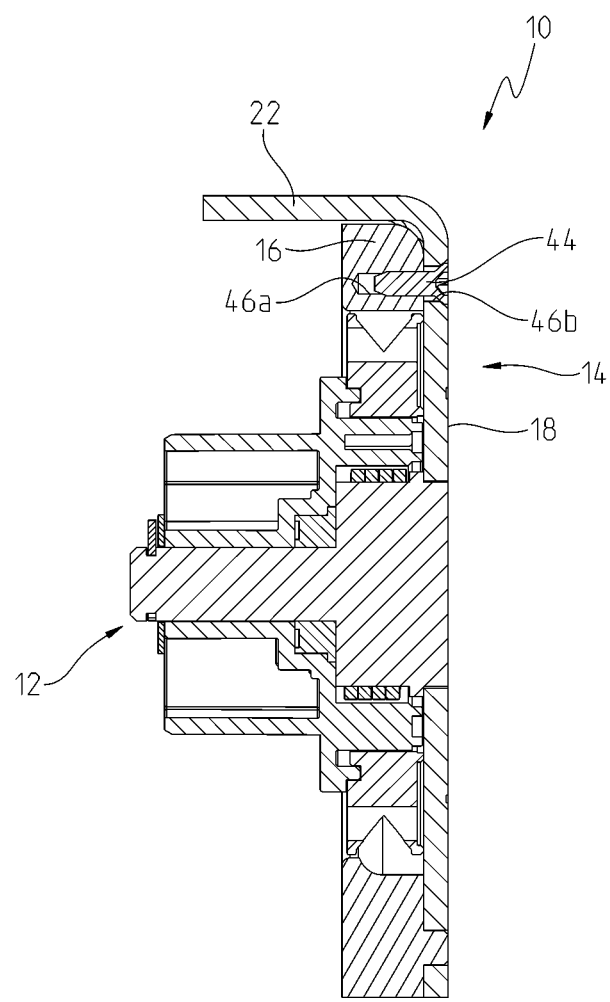
FIG. 14 is a cross-sectional view of the housing and roller clutch assemblies of FIG. 12, taken along line 14-14 of FIG. 12.

Referring to FIGS. 9-14, housing assembly 14 is shown coupled with a removable bracket 170. Illustratively, as shown in FIGS. 9-11, removable bracket 170 may be coupled to housing assembly 14 along first side 28 and/or, as shown in FIGS. 12-14, removable bracket 170 may be coupled to housing assembly 14 along second side 30. Removable bracket 170 may be comprised of a rigid polymeric material and includes a body portion 172 and at least one tab 174. Body portion 172 includes apertures 173 which are configured to receive removable fasteners (e.g., screws) to couple removable bracket 170 and housing assembly 14 to the window casing, wall, or other similar structure.

In one embodiment, and referring still to FIGS. 9-14, removable bracket 170 includes two tabs 174, each of which includes an aperture 176, and tabs 174 are spaced apart by a distance 178. Illustratively, distance 178 between tabs 174 may be approximately equal to the distance between apertures 173 on body portion 172. Tabs 174 are generally perpendicular to body portion 172 and are configured to be received within slots 42 along first and second sides 28, 30 of housing assembly 14. In this way, tabs 174 are generally parallel to outer and inner covers 16, 18 and, when removable bracket 170 is coupled to housing assembly 14, body portion 172 is positioned generally perpendicularly to outer and inner covers 16, 18.

Additionally, and as shown best in FIGS. 10 and 13, tabs 174 are configured to generally straddle a portion of clutch assembly 12. More particularly, the upper tab 174 of removable bracket 170 aligns with the upper apertures 20a, 20b of outer and inner covers 16, 18, respectively, while the lower tab 174 of removable bracket 170 aligns with the lower apertures 20a, 20b, of outer and inner covers 16, 18, respectively. Opening 66 of outer cover 16, which is configured to receive a portion of clutch assembly 12, at least partially extends between the upper and lower apertures 20a on outer cover 16 such that a portion of clutch assembly 12 is vertically aligned with and vertically intermediate apertures 20a. Further, a portion of clutch assembly 12 is positioned between apertures 20 and one of a side of housing assembly 14. In this way, tabs 174 are positioned at least partially above and at least partially below a portion of clutch assembly 12 but do not interfere with clutch assembly 12 when removable bracket 170 is coupled to housing assembly 14. Tabs 174 also are laterally and vertically offset from axis A of clutch assembly 12 such that tabs 174 are not aligned with axis A. Illustratively, tabs 174 may have a curved surface 175 which generally follows the circular shape of opening 66 and beaded chain wheel 52 to allow tabs 174 to couple with housing assembly 14 without interference to clutch assembly 12.

Removable bracket 170 is removably coupled to housing assembly 14 with removable fasteners 180 (e.g., screws) which are received through apertures 20b of inner cover 18, through apertures 176 of tabs 174, and terminate within a portion of apertures 20a of outer cover 16. In this way, one set of fasteners 180 may be used to couple together outer and inner covers 16, 18 of housing assembly 14 and simultaneously couple removable bracket 170 to housing assembly 14. To couple housing assembly 14 and removable bracket 170 with the window casing, wall, or other structure, fasteners 180 couple removable bracket 170 along one side of housing 14, leaving at least two of apertures 20 available for receiving additional fasteners configured to couple housing assembly 14 to the casing or wall. Additionally, fasteners are received through apertures 173 of removable bracket 170 for coupling to the wall or casing.

Figure 15:
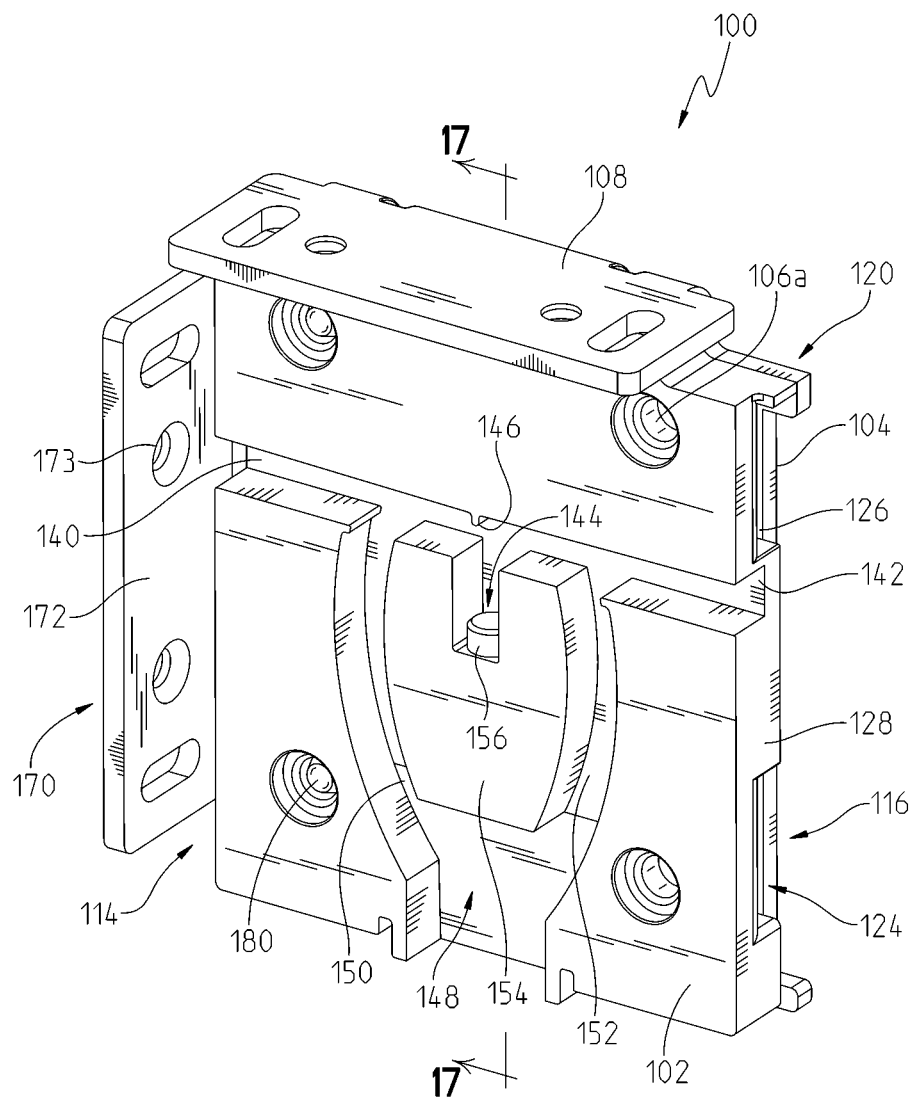
FIG. 15 is a front perspective view of the second housing assembly of FIG. 5 coupled with the removable bracket on a first lateral side.
Figure 16:
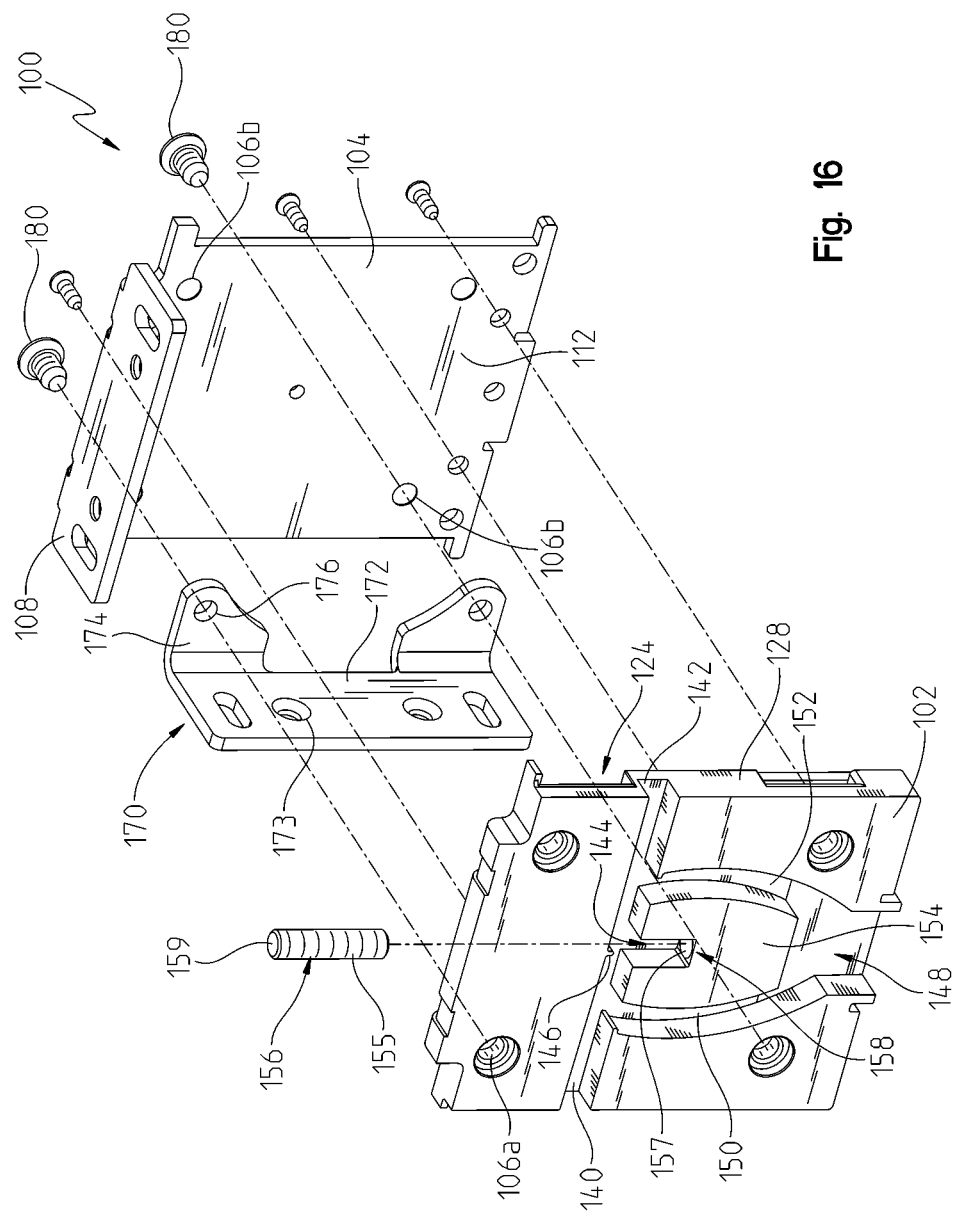
FIG. 16 is a front exploded view of the second housing assembly of FIG. 15.
Figure 17:
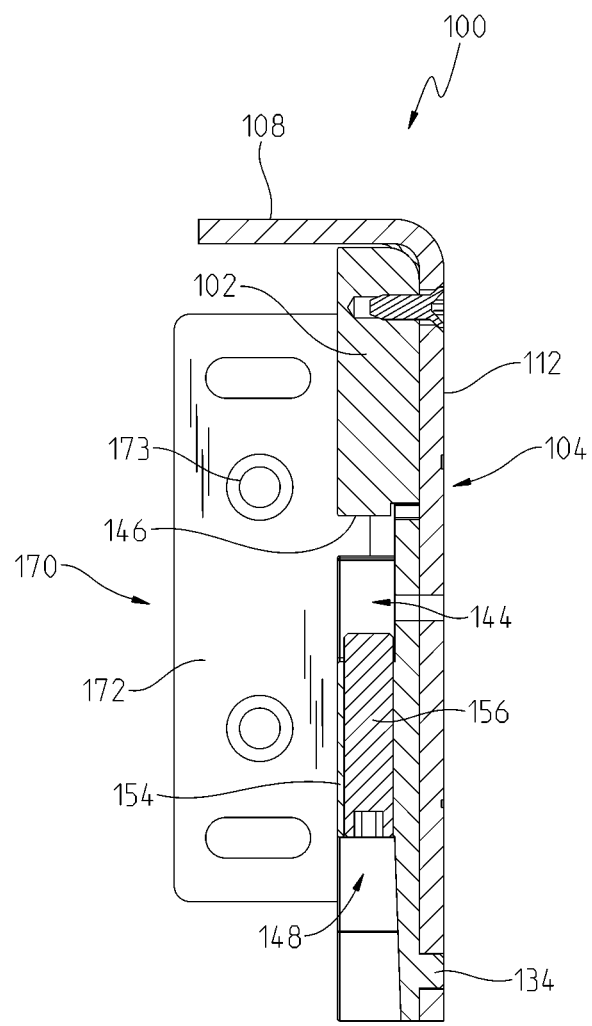
FIG. 17 is a cross-sectional view of the second housing assembly of FIG. 15, taken along line 17-17 of FIG. 15.
Figure 18:
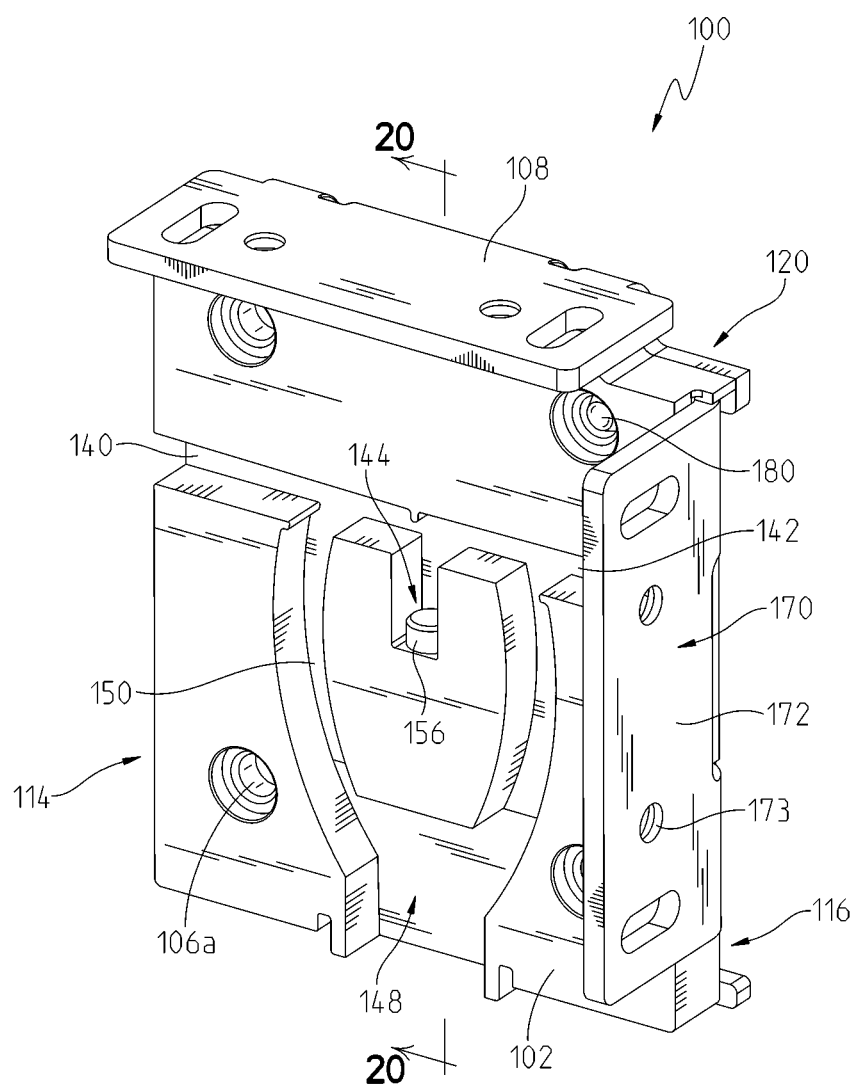
FIG. 18 is a front perspective view of the second housing assembly of FIG. 5 coupled with the removable bracket on the opposing lateral side thereof.
Figure 19:
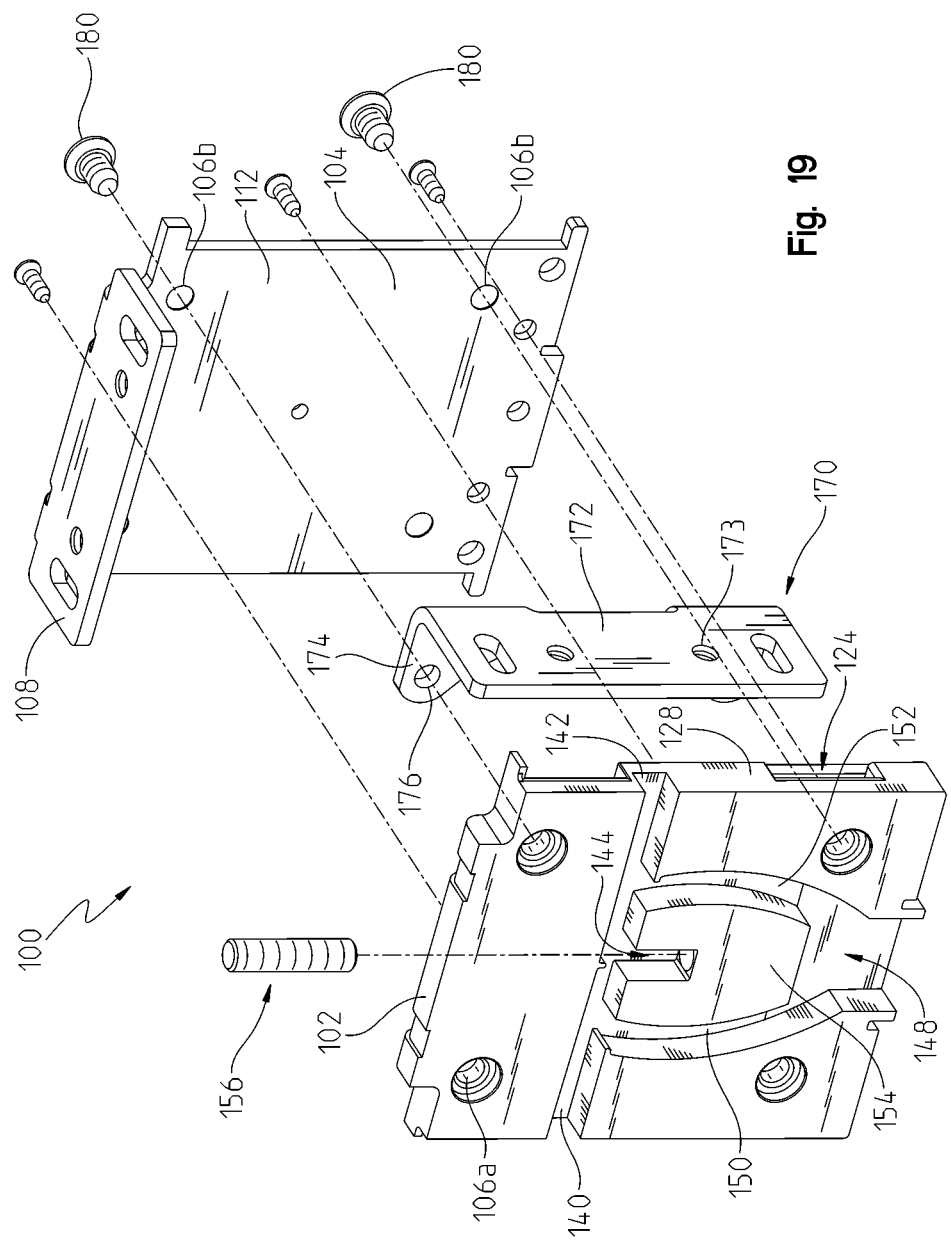
FIG. 19 is a front exploded view of the second housing assembly of FIG. 18.
Figure 20:
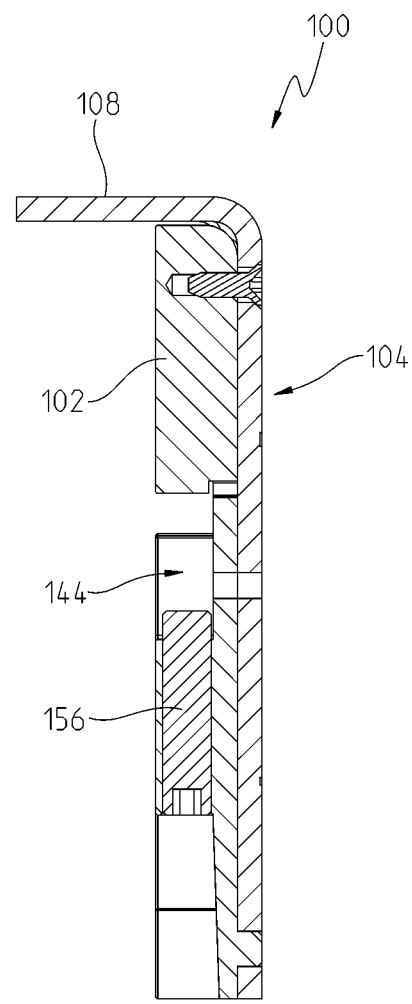
FIG. 20 is a cross-sectional view of the second housing assembly of FIG. 18, taken along line 20-20 of FIG. 18.
Figure 21:
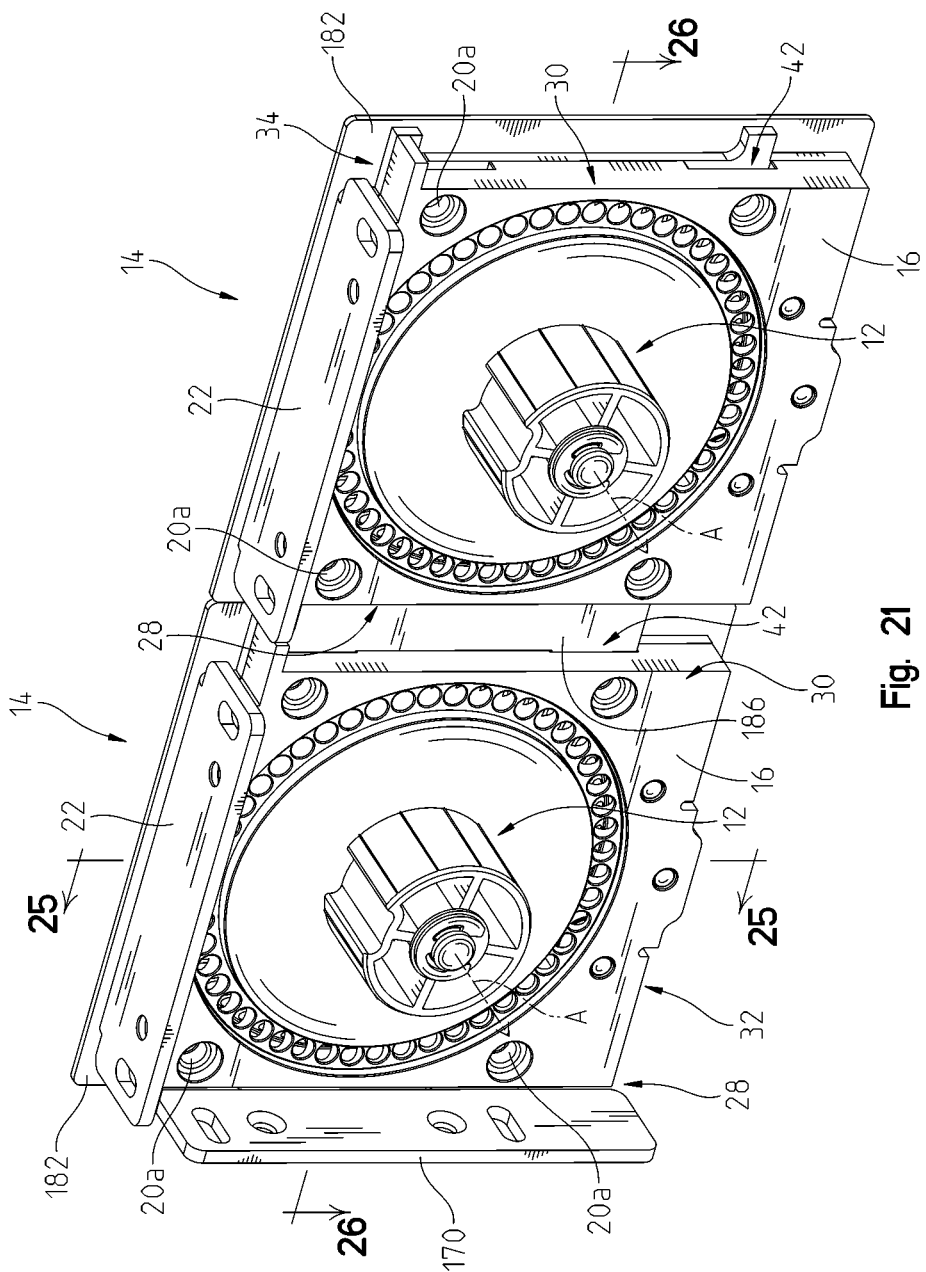
FIG. 21 is a front perspective view of multiple housing and roller clutch assemblies of FIG. 1 coupled together.
Figure 22:
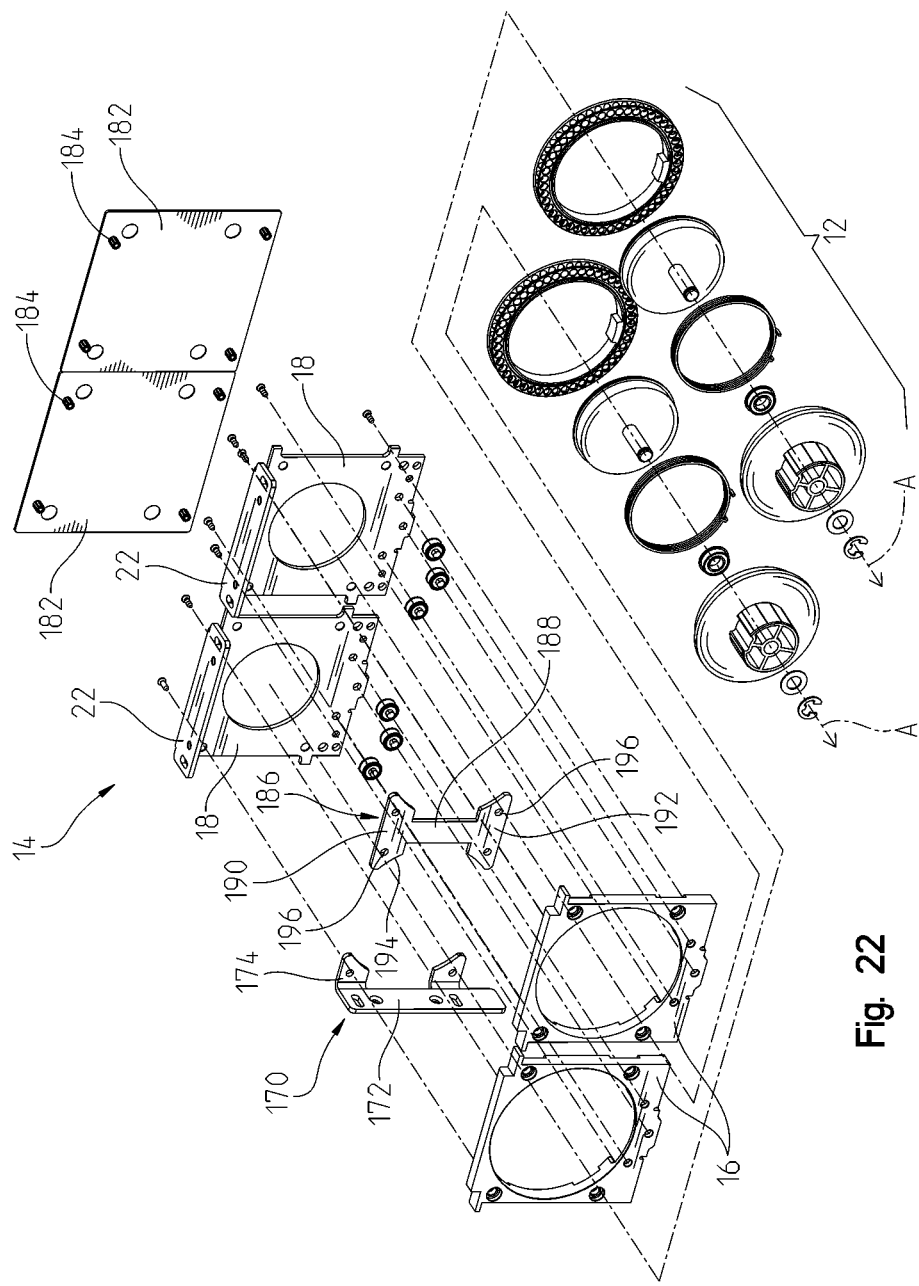
FIG. 22 is a front exploded view of the housing and roller clutch assemblies of FIG. 21.

Referring to FIGS. 15-20, second housing assembly 100 also is configured to couple with removable bracket 170 along either of first or second sides 114, 116. Illustratively, as shown in FIGS. 15-17, removable bracket 170 may be coupled to second housing assembly 100 along first side 114 and/or, as shown in FIGS. 18-20, removable bracket 170 may be coupled to second housing assembly 100 along second side 116. More particularly, removable bracket 170 is removably coupled to second housing assembly 100 with removable fasteners 180 (e.g., screws) which are received through apertures 106b of inner cover 104, through apertures 176 of tabs 174, and terminate within a portion of apertures 106a of outer cover 102. In this way, one set of fasteners 180 may be used to couple together outer and inner covers 102, 104 of second housing assembly 100 and simultaneously couple removable bracket 170 to second housing assembly 100. To couple second housing assembly 100 and removable bracket 170 with the window casing, wall, or other structure, fasteners 180 couple removable bracket 170 along one side of second housing assembly 100, leaving at least two of apertures 106 available for receiving additional fasteners configured to couple second housing assembly 100 to the casing or wall. Additionally, fasteners are received through apertures 173 of removable bracket 170 for coupling to the wall or casing.

By using removable bracket 170 to couple housing assemblies 14, 100 to the window casing, wall, or other similar structure, the user or installer is able to support clutch assembly 12, roller 91, and fabric covering 90 (FIG. 4) on two surfaces because housing assemblies 14, 100 may be coupled to a first surface and removable bracket 170 may be coupled to a second surface. In this way, regardless of the configuration of the wall, window casing, etc., removable bracket 170 can be positioned to either side of housing assemblies 14, 100 for coupling to the wall, window, etc.

Referring now to FIGS. 21-26, it is possible to couple together multiple housing assemblies 14. In this way, multiple rollers and fabric coverings 90 (FIG. 4) may be positioned in parallel (i.e. axes A of adjacent clutch assemblies 12 are parallel) to accommodate various options for providing covering to a window or wall area. Illustratively, two housing assemblies 14 are aligned such that first side 28 of one of housing assemblies 14 is positioned adjacent second side 30 of the other housing assembly 14. In this configuration, clutch assemblies 12 of housing assemblies 14 are parallel to each other and can accommodate parallel rollers. To maintain alignment of housing assemblies 14, each housing assembly 14 may be coupled to a mounting plate 182 through pins 184 which are received through various openings on inner cover 18. Additionally, mounting plates 182 may be configured to be coupled to a wall, window casing, etc. with removable fasteners (not shown).

Mounting plates 182 may be coupled together or separate from each other. In one embodiment, housing assemblies 14 may be removably coupled together through mounting plates 182 and/or through a joining member 186. More particularly, when second side 30 of one housing assembly 14 is positioned adjacent first side 28 of the other housing assembly 14, slots 42 of these adjacent housing assemblies 14 face each other. It is these slots 42 which face each other which are configured to receive joining member 186 for aligning and coupling together housing assemblies 14.

As shown in FIGS. 21-24, joining member 186 generally defines an "I" shape and includes a center portion 188, an upper portion 190, and a lower portion 192. Portions 188, 190, 192 of joining member 186 are integrally formed together and may be comprised of a metallic and/or polymeric material. Upper and lower portions 190, 192 each includes curved surfaces 194, as disclosed further herein, and also each includes apertures 196 for coupling to housing assemblies 14 with removable fasteners received therethrough. The joining member 186 includes a proximal end spaced apart from a distal end (e.g., upper portion 190 spaced apart from lower portion 192) along a first joining member axis (e.g., an axis that runs between the upper portion 190 and the lower portion 192), the joining member symmetric about the first joining member axis, the joining member having a second joining member axis (e.g., an axis that bisects the joining member 186 with the upper portion 190 on one side of the first joining member axis and the lower portion 192 on the other side of the first joining member axis) transverse to the first joining member axis, the second joining member axis located intermediate the proximal end and the distal end, the joining member symmetric about the second joining member axis.

As shown, upper and lower portions 190, 192 are received within slots 42 of housing assemblies 14 and are configured to generally straddle a portion of clutch assembly 12. Illustratively, curved surfaces 194 of upper and lower portions 190, 192 of joining member 186, are generally complementary to the curve of opening 66 of outer cover 16 and beaded chain wheel 52 such that upper and lower portions 190, 192 are configured to extend around and adjacent a portion of beaded chain wheel 52 and do not interfere with beaded chain wheel 52. In this way, a portion of beaded chain wheel 52 is positioned vertically intermediate upper and lower portions 190, 192.

Figure 4:
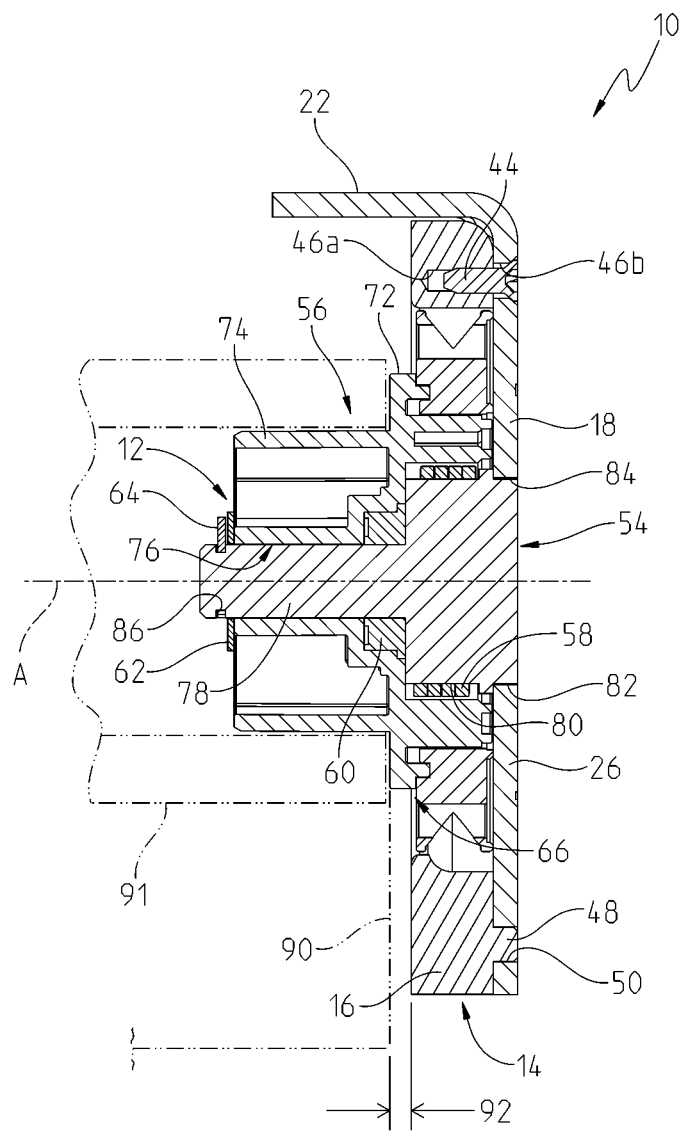
FIG. 4 is a cross-sectional view of the housing and roller clutch assemblies of FIG. 1, taken along line 4-4 of FIG. 1.

Advantages, among others, of using joining member 186, as well as the using of removable bracket(s) 170, is to allow for interchangeability of housing assemblies 14, the reduction in the number of stock components due to removable brackets 170 being coupled to the housing assemblies in different locations, and different mounting configurations for housing assemblies 14. For example, because joining member 186 and removable bracket 170 are removable from housing assembly 14, joining member 186 and/or any number of removable brackets 170 may be coupled with or removed from housing assembly 14 in order to achieve the desired position, orientation, and alignment of the roller and fabric covering 90 (FIG. 4). In this way, housing assemblies 14 may be used to support one or more rollers and fabric coverings 90 (FIG. 4) in various locations and regardless of the orientation and configuration of a window or wall area. Additionally, because tabs 174 of removable bracket 170 and upper and lower portions 190, 192 of joining member 186 are laterally and vertically offset from axis A of clutch assembly 12, removable bracket 170 and joining member 186 do not interfere with any portion of clutch assembly 12.

Joining member 186 may have any suitable shape to locate a second roller 91 relative to a first roller 91. In the illustrated embodiment, joining member 186 would locate a second roller 91 such that its axis A is generally horizontally aligned with the axis A of a first roller 91. In other embodiments, joining member 186 may locate the second roller 91 relative to first roller 91 such there axes A are vertically offset.

Figure 23:
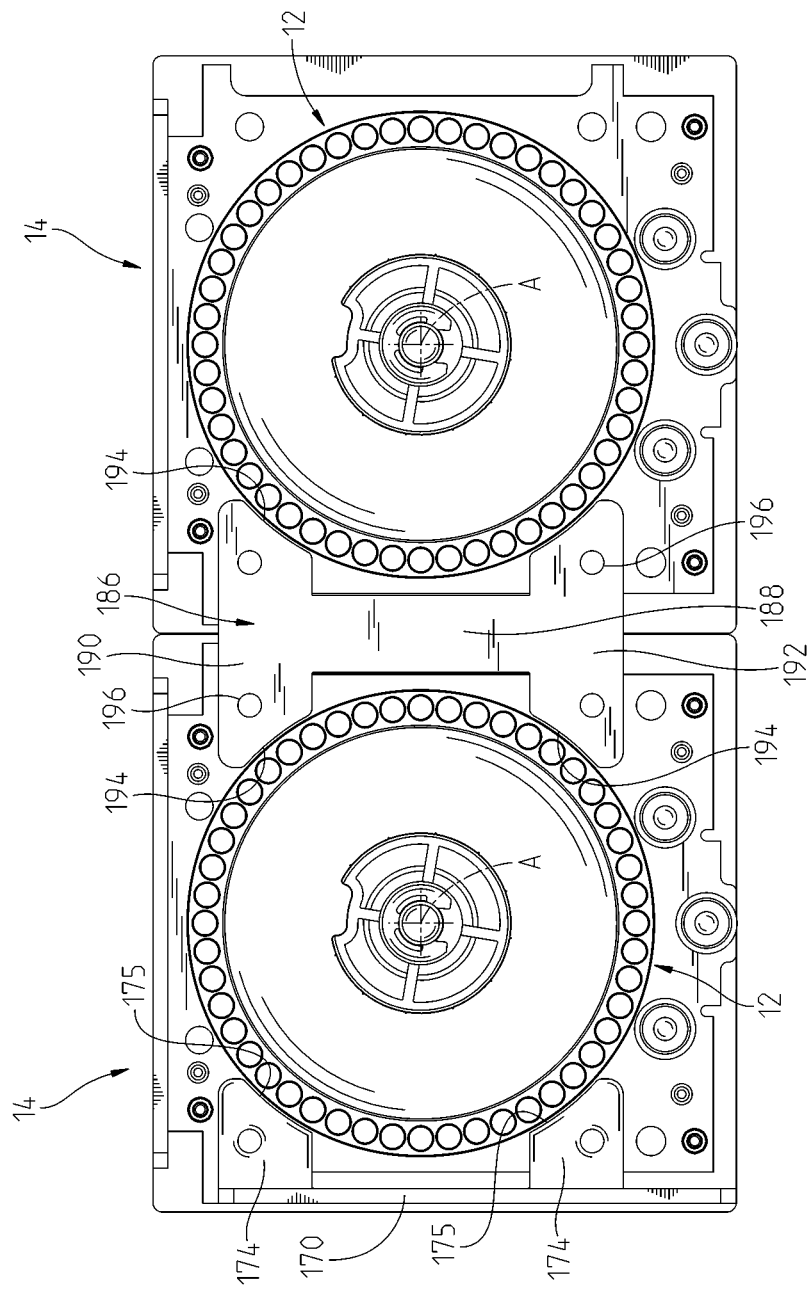
FIG. 23 is a front view of the housing and roller clutch assemblies of FIG. 21, with outer covers removed to expose a mounting bracket.
Figure 24:
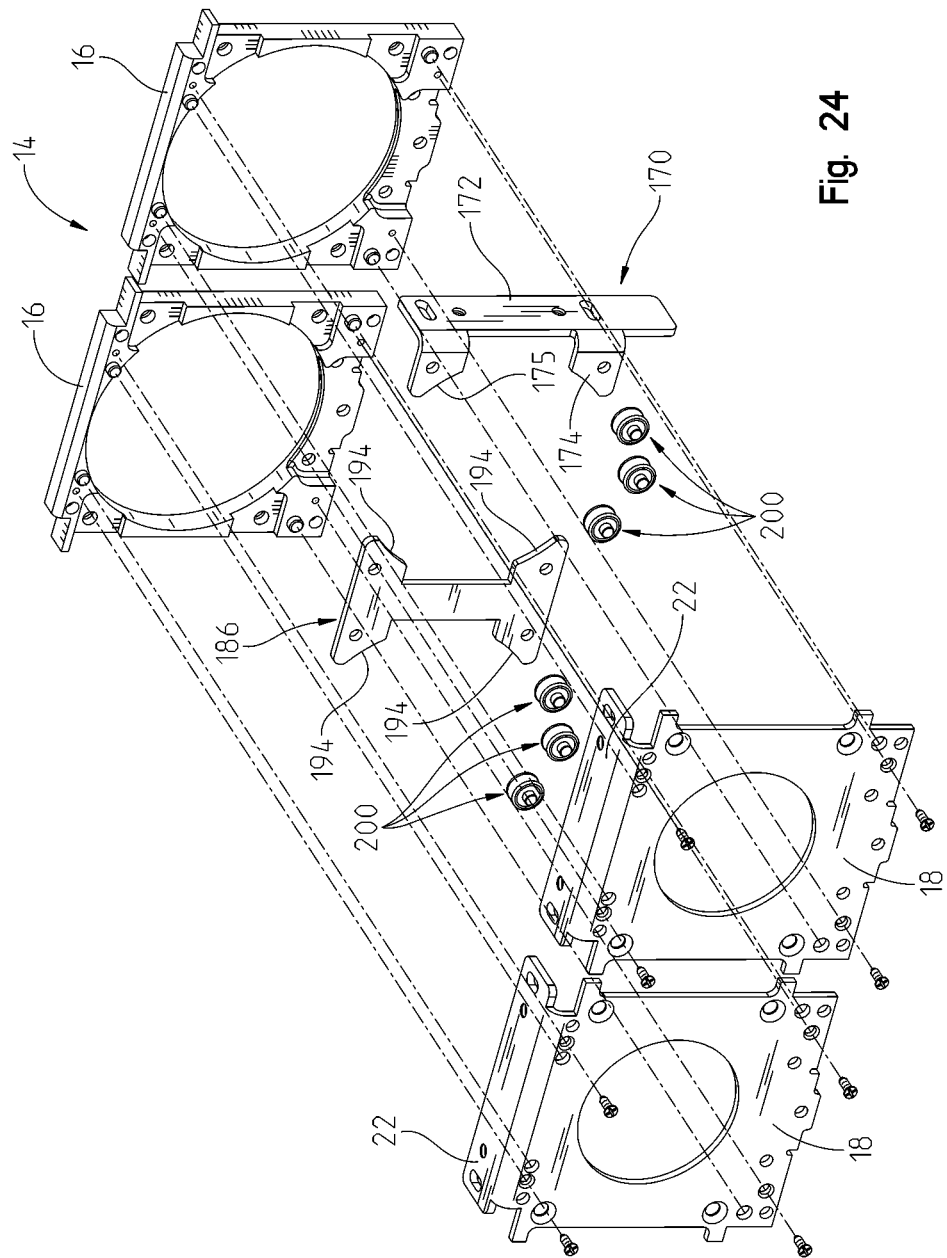
FIG. 24 is a rear exploded view of housing assemblies of FIG. 21.
Figure 25:
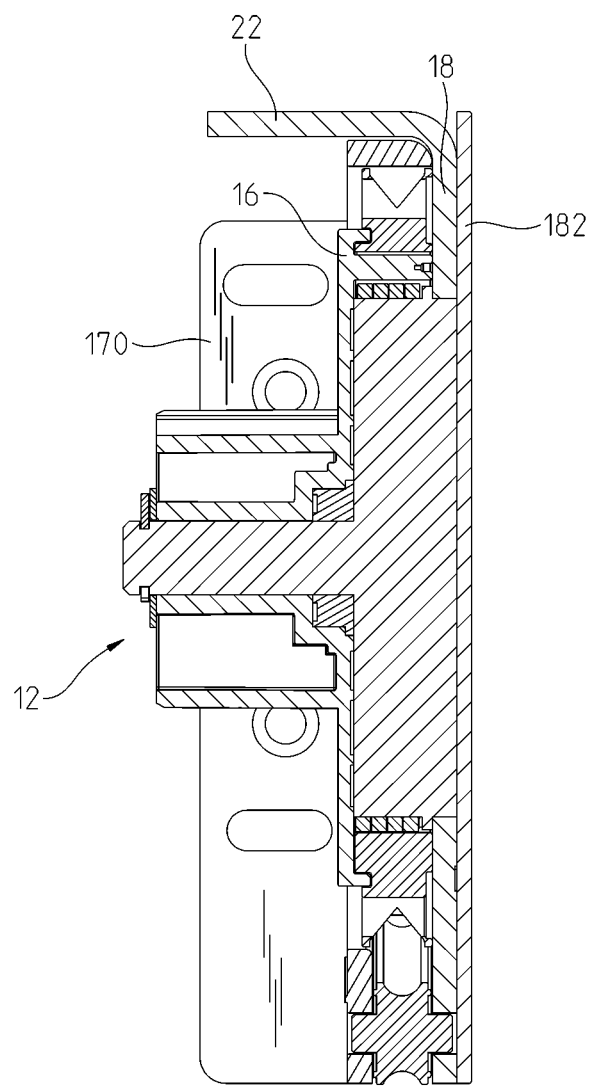
FIG. 25 is a cross-sectional view of the housing and roller clutch assemblies of FIG. 21, taken along line 25-25 of FIG. 21.
Figure 26:
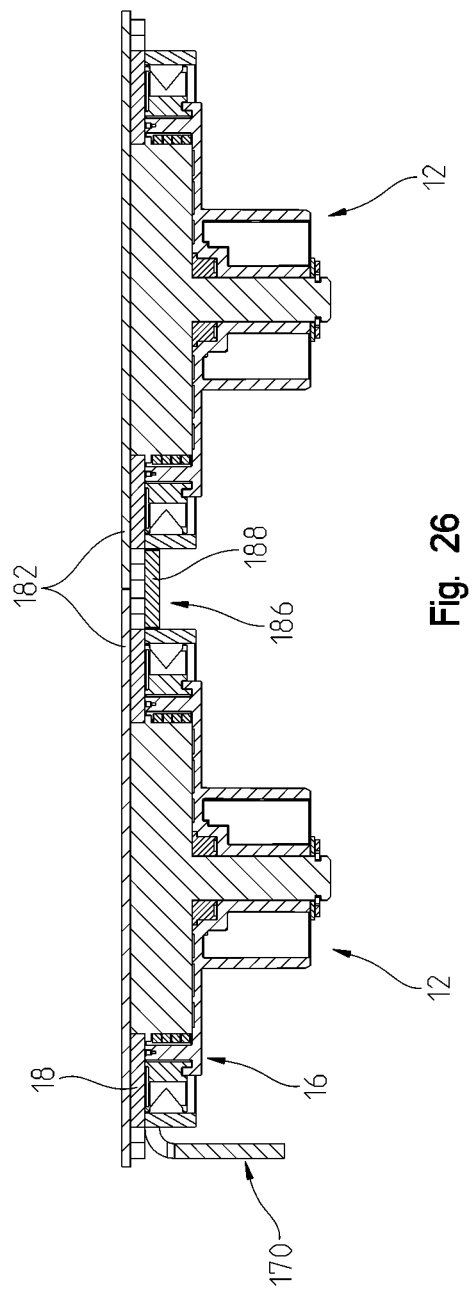
FIG. 26 is a further cross-sectional view of the housing and roller clutch assemblies of FIG. 21, taken along line 26-26 of FIG. 21.

Referring to FIGS. 23 and 24, in embodiments, housing assembly 14 includes rollers 200 which are captured between outer cover 14 and inner cover 16. Rollers 200 assist in guiding the bead chain 53 of clutch assembly 12 and in reducing resistance to the movement of the bead chain 53 of clutch assembly 12.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed is:

1. A system for supporting a fabric covering, the system comprising:
    a first roller clutch assembly rotatable about an axis;
    a first housing assembly configured to support the first roller clutch assembly;
    a bracket configured to be removably coupled within a first portion of the first housing assembly and configured to support the first housing assembly on an external structure; and
    a joining member configured to be removably coupled within a second portion of the first housing assembly, a portion of the joining member is received in an opening in the first housing assembly along a first direction perpendicular to the axis, the portion overlapping with a rotatable element of the roller clutch assembly along the axis when viewed from a second direction perpendicular to the axis and intersecting the joining member, the joining member having a proximal end spaced apart from a distal end along a first joining member axis, the joining member symmetric about the first joining member axis, the joining member having a second joining member axis transverse to the first joining member axis, the second joining member axis located intermediate the proximal end and the distal end, the joining member symmetric about the second joining member axis.

2. The system of claim 1, wherein the bracket and the joining member are positioned on opposite sides of the axis of the first roller clutch assembly.

3. The system of claim 1, further comprising a second housing assembly for supporting a second roller clutch assembly, and the joining member is removably coupled to a portion of the second housing assembly.

4. The system of claim 1, further comprising a second housing assembly for supporting a second roller clutch assembly, and the joining member is removably coupled to a portion of the second housing assembly.

5. The system of claim 4, wherein the joining member is positioned laterally intermediate axes of rotation of the first and second roller clutch assemblies.

6. The system of claim 1, wherein the bracket is completely radially outside of an envelope of the roller clutch assembly when viewed along the axis.

7. The system of claim 6, wherein the joining member is completely radially outside of the envelope of the roller clutch assembly when viewed along the axis.

8. The system of claim 3, wherein the first housing assembly includes a first cover and a second cover receiving a first portion of the joining member therebetween and the second housing assembly includes a third cover and a fourth cover receiving a second portion of the joining member therebetween.

9. The system of claim 1, further comprising an idler assembly having a first side, a second side, a third side, and a fourth side, wherein each of the first, second, third, and fourth sides defines a mounting interface of the idler assembly within a depth of the idler assembly configured to couple with the bracket.

10. The system of claim 9, further comprising a second bracket received within the depth of the idler assembly and removably coupled to the mounting interface at any of the first, second, third, or fourth sides.

11. The system of claim 1, wherein the joining member includes a first mounting portion, a second mounting portion, and an intermediate portion located between the first mounting portion and the second mounting portion, the first mounting portion extending from the intermediate portion, each of the first mounting portion and second mounting portion configured to mount with the first housing assembly.

12. A system for supporting a fabric covering, the system comprising:
- a roller clutch assembly having a bead chain wheel rotatable about an axis and a bead chain carried by the bead chain wheel;
- a housing assembly having a first side, a second side, a third side, and a fourth side, and at least one of the first, second, third, and fourth sides defines a mounting interface of the housing assembly within a depth of the housing assembly, the housing assembly including an outer cover and an inner cover removably coupled to the outer cover, the inner cover including an opening intersecting the axis of the roller clutch assembly and at least one channel which receives the bead chain of the roller clutch assembly; and
- a first portion of a bracket received within the depth of the housing assembly between the inner cover and the outer cover along a first plane intersecting the axis and removably coupled to the mounting interface, and including a second portion of the bracket extending away from the first portion in a second plane angled to the first plane to facilitate the selective coupling of the system to at least one of a first surface parallel to the first plane and a second surface parallel to the second plane, the bracket completely radially outside of an envelope of the bead chain wheel when viewed along the axis;
- wherein the second portion of the bracket is structurally configured to support mounting loads of the housing assembly, bracket, and roller clutch when the second portion is fastened to an exterior surface.

13. The system of claim 12, wherein the housing assembly includes a plurality of slots positioned along at least one of the first, second, third, and fourth sides which are configured to receive a portion of the bracket.

14. The system of claim 13, wherein the bracket includes a tab configured to be received within a first slot of the plurality of slots.

15. The system of claim 14, wherein the tab is coupled to the mounting interface of the housing assembly with a removable fastener.

16. The system of claim 12, wherein a portion of the bracket has a concave surface generally complementary to a circumference of the roller clutch assembly.

17. The system of claim 12, wherein the bracket is positioned completely to a first side of the axis.

18. The system of claim 12, further comprising a fastener configured to couple the bracket to the housing assembly, and the fastener extends through the inner cover and the bracket, and the fastener is received within an opening of the outer cover.

19. The system of claim 18, wherein the fastener terminates within the opening of the outer cover.

20. The system of claim 12, wherein the housing assembly includes a plurality of slots positioned along at least one of the first, second, third, and fourth sides which are configured to receive a portion of the bracket, the bracket including a first tab configured to be received within a first slot of the plurality of slots and a second tab spaced apart from the first tab and configured to be received within a second slot of the plurality of slots, wherein the first tab is coupled to the mounting interface of the housing assembly with a first removable fastener and the second tab is coupled to the mounting interface of the housing assembly with a second removable fastener.

21. The system of claim 20, wherein the inner cover and the outer cover cooperate to form the first slot of the plurality of slots.

22. The system of claim 21, wherein a portion of the bracket has a concave surface generally complementary to a circumference of the roller clutch assembly.

23. The system of claim 22, wherein the bracket is positioned completely to a first side of the axis.

24. The system of claim 12, wherein the bracket is removably coupled to a mounting surface of any of the first, second, third or fourth sides.

25. The system of claim 12, wherein the first portion of the bracket includes a coupling opening configured to selectively couple the first portion to the mounting interface, and wherein the second portion of the bracket includes a coupling opening configured to selectively couple the system to at least one of the first surface and the second surface.

* * * * *